US010991924B2

(12) United States Patent
Fees et al.

(10) Patent No.: US 10,991,924 B2
(45) Date of Patent: Apr. 27, 2021

(54) PRESSURE EQUALIZATION BETWEEN BATTERY MODULE COMPARTMENTS OF AN ENERGY STORAGE SYSTEM AND EXTERNAL ENVIRONMENT

(71) Applicant: InEVit LLC, Santa Clara, CA (US)

(72) Inventors: Heiner Fees, Bietigheim-Bissingen (DE); Andreas Track, Sachsenheim (DE); Alexander Eichhorn, Eppingen (DE); Ralf Maisch, Abstatt (DE); Jörg Damaske, Freiberg (DE)

(73) Assignee: TIVENI MERGECO, INC., Redwood City, CA (US)

( * ) Notice: Subject to any disclaimer, the term of this patent is extended or adjusted under 35 U.S.C. 154(b) by 258 days.

(21) Appl. No.: 15/831,607

(22) Filed: Dec. 5, 2017

(65) Prior Publication Data

US 2019/0123318 A1 Apr. 25, 2019

Related U.S. Application Data

(60) Provisional application No. 62/574,457, filed on Oct. 19, 2017.

(51) Int. Cl.
*H01M 2/12* (2006.01)
*H01M 2/10* (2006.01)
(Continued)

(52) U.S. Cl.
CPC ....... *H01M 2/1264* (2013.01); *H01M 2/1077* (2013.01); *H01M 2/1083* (2013.01);
(Continued)

(58) Field of Classification Search
CPC ............. H01M 2/1264; H01M 2/1077; H01M 2/1083; H01M 10/613
See application file for complete search history.

(56) References Cited

U.S. PATENT DOCUMENTS

| 8,876,947 B2 * | 11/2014 | Reitzle | B01D 53/268 95/10 |
| 2010/0314182 A1 * | 12/2010 | Crain | B60K 1/04 180/60 |

(Continued)

FOREIGN PATENT DOCUMENTS

| CN | 206542226 U | * 10/2017 |
| DE | 10 2014 225845 A1 | 6/2016 |
| WO | 2015 025017 A1 | 2/2015 |

OTHER PUBLICATIONS

Machine Translation of DE 102014225845.*
International Search Report and Written Opinion dated Dec. 14, 2018 in International Application No. PCT/US2018/055863.

*Primary Examiner* — Jonathan G Jelsma
(74) *Attorney, Agent, or Firm* — Muncy, Geissler, Olds & Lowe, P.C.; Daniel Podhajny

(57) ABSTRACT

In an embodiment, an energy storage system includes a battery module mounting area with a plurality of battery module compartments, each of the battery module compartments configured to house a respective battery module, and a venting arrangement configured to define a set of air channels that permits pressure equalization between the plurality of battery module compartments and an external environment. The venting arrangement is configured with an air-permeable, liquid-tight seal at least between (i) the plurality of battery module compartments and (ii) the external environment.

14 Claims, 36 Drawing Sheets

(51) Int. Cl.
*H01M 10/613* (2014.01)
*H01M 2/20* (2006.01)
*H01M 2/34* (2006.01)

(52) U.S. Cl.
CPC .......... *H01M 2/206* (2013.01); *H01M 2/348* (2013.01); *H01M 10/613* (2015.04); *H01M 2200/20* (2013.01); *H01M 2220/20* (2013.01)

(56) References Cited

U.S. PATENT DOCUMENTS

| | | | |
|---|---|---|---|
| 2012/0237804 A1* | 9/2012 | Yoon | H01M 2/36 429/72 |
| 2013/0295428 A1* | 11/2013 | Hatta | H01M 2/1088 429/99 |
| 2015/0064514 A1* | 3/2015 | Wu | H01M 2/1016 429/56 |
| 2016/0372726 A1 | 12/2016 | Baldwin | |
| 2018/0062128 A1* | 3/2018 | Gunther | H01M 2/1077 |
| 2019/0033164 A1* | 1/2019 | Ing | G01M 3/3236 |

* cited by examiner

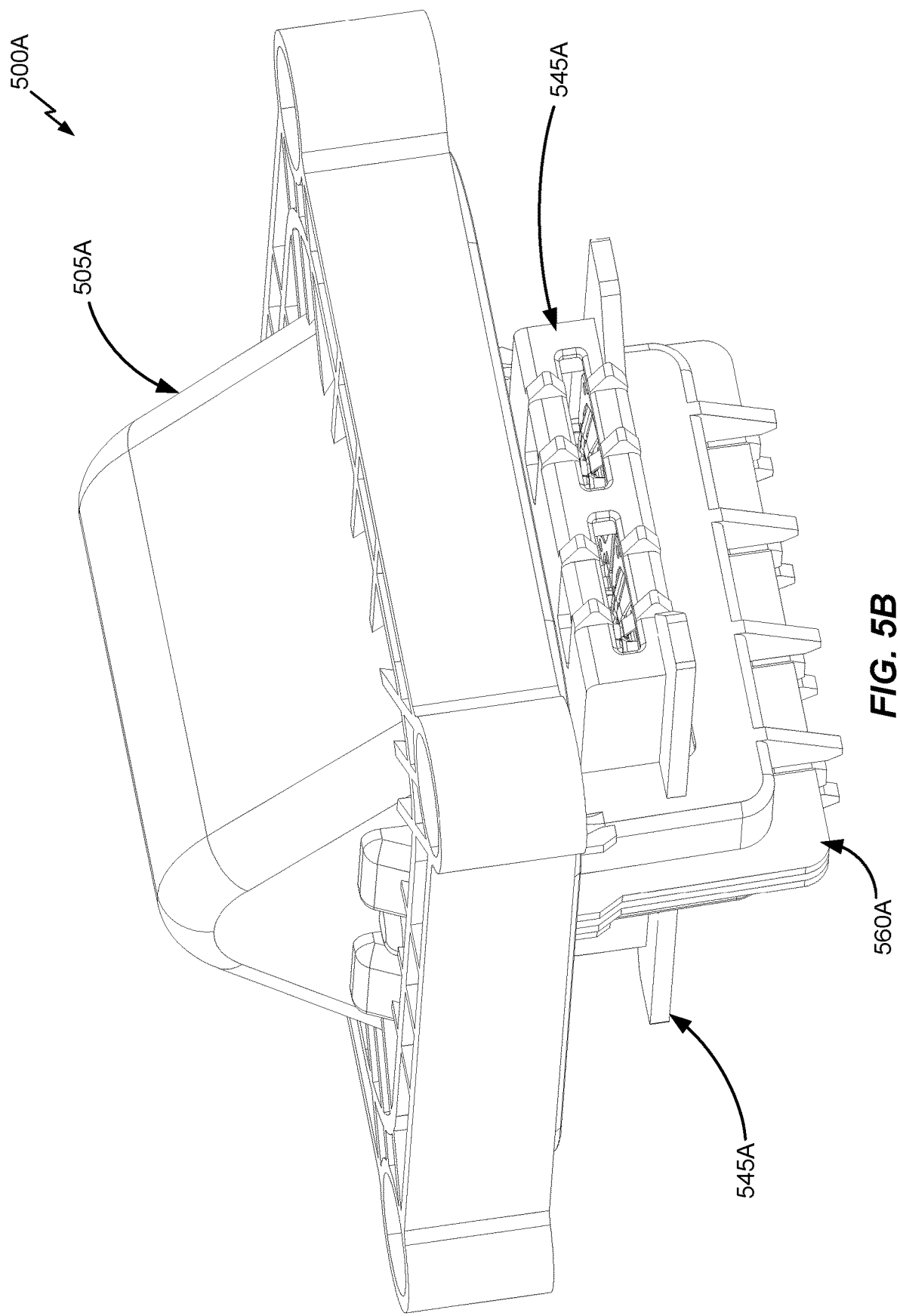

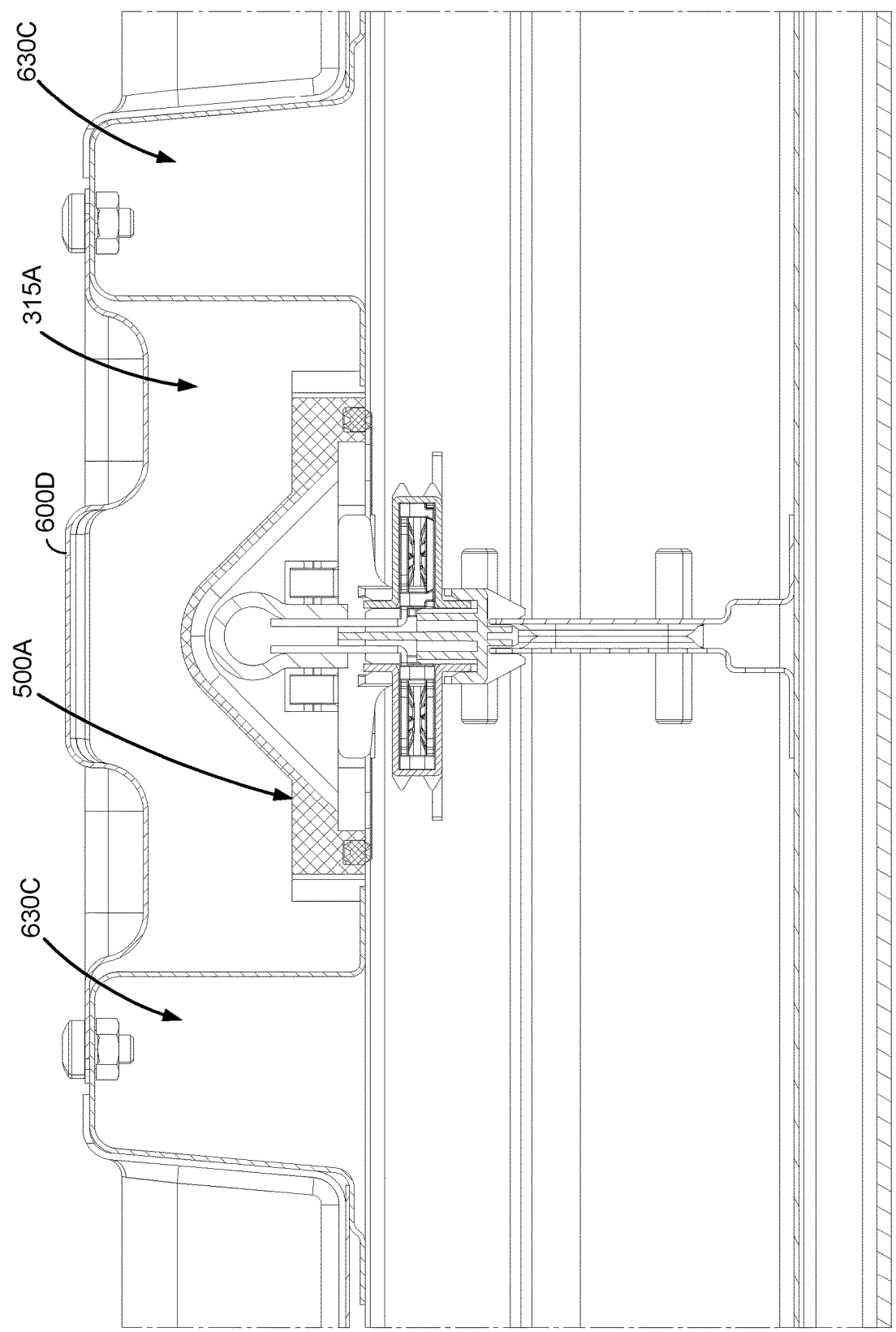

PRESSURE EQUALIZATION BETWEEN BATTERY MODULE COMPARTMENTS OF AN ENERGY STORAGE SYSTEM AND EXTERNAL ENVIRONMENT

CROSS-REFERENCE TO RELATED APPLICATIONS

The present Application for Patent claims the benefit of U.S. Provisional Application No. 62/574,457, entitled "PRESSURE EQUALIZATION BASED ON AIRFLOW BETWEEN BATTERY MODULES OF AN ENERGY STORAGE SYSTEM AND EXTERNAL ENVIRONMENT WITH AIR-PERMEABLE, LIQUID-TIGHT SEALING", filed Oct. 19, 2017, which is assigned to the assignee hereof and hereby expressly incorporated by reference herein in its entirety.

BACKGROUND

1. Field of the Disclosure

Embodiments relate to pressure equalization between battery module compartments of an energy storage system and an external environment.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

In an embodiment, an energy storage system includes a battery module mounting area with a plurality of battery module compartments, each of the battery module compartments configured to house a respective battery module, and a venting arrangement configured to define a set of air channels that permits pressure equalization between the plurality of battery module compartments and an external environment. The venting arrangement is configured with an air-permeable, liquid-tight seal at least between (i) the plurality of battery module compartments and (ii) the external environment.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIGS. 5A-5G illustrates various perspectives of a module-to-module power connector in accordance with an embodiment of the disclosure.

FIG. 6D illustrates a perspective of the tunnel space that is defined by the battery housing reinforcement configuration of FIG. 6C in accordance with an embodiment of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1:
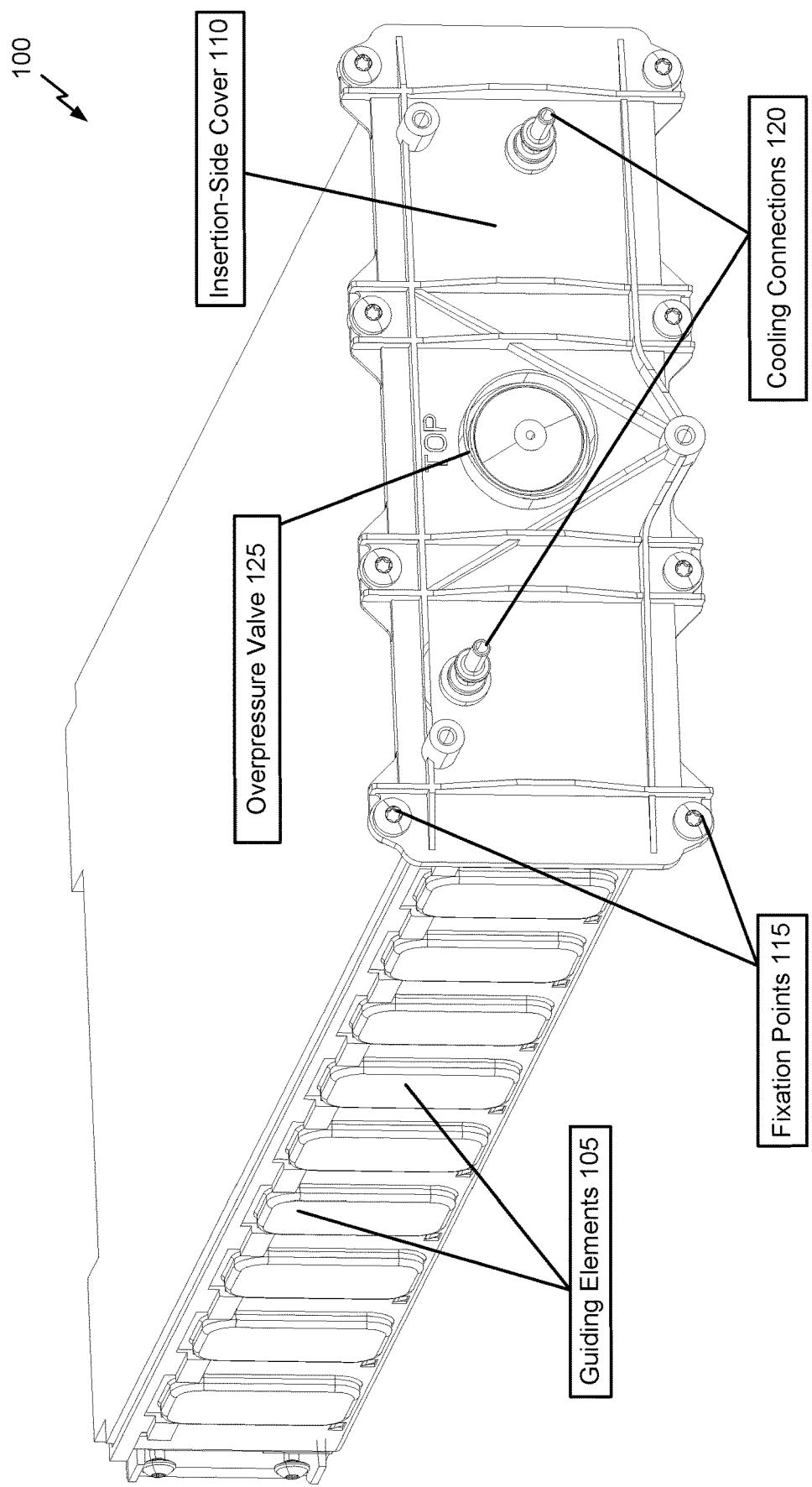
FIG. 1 illustrates a front-perspective of an exterior framing of a battery module in accordance with an embodiment of the disclosure.
Figure 2A:
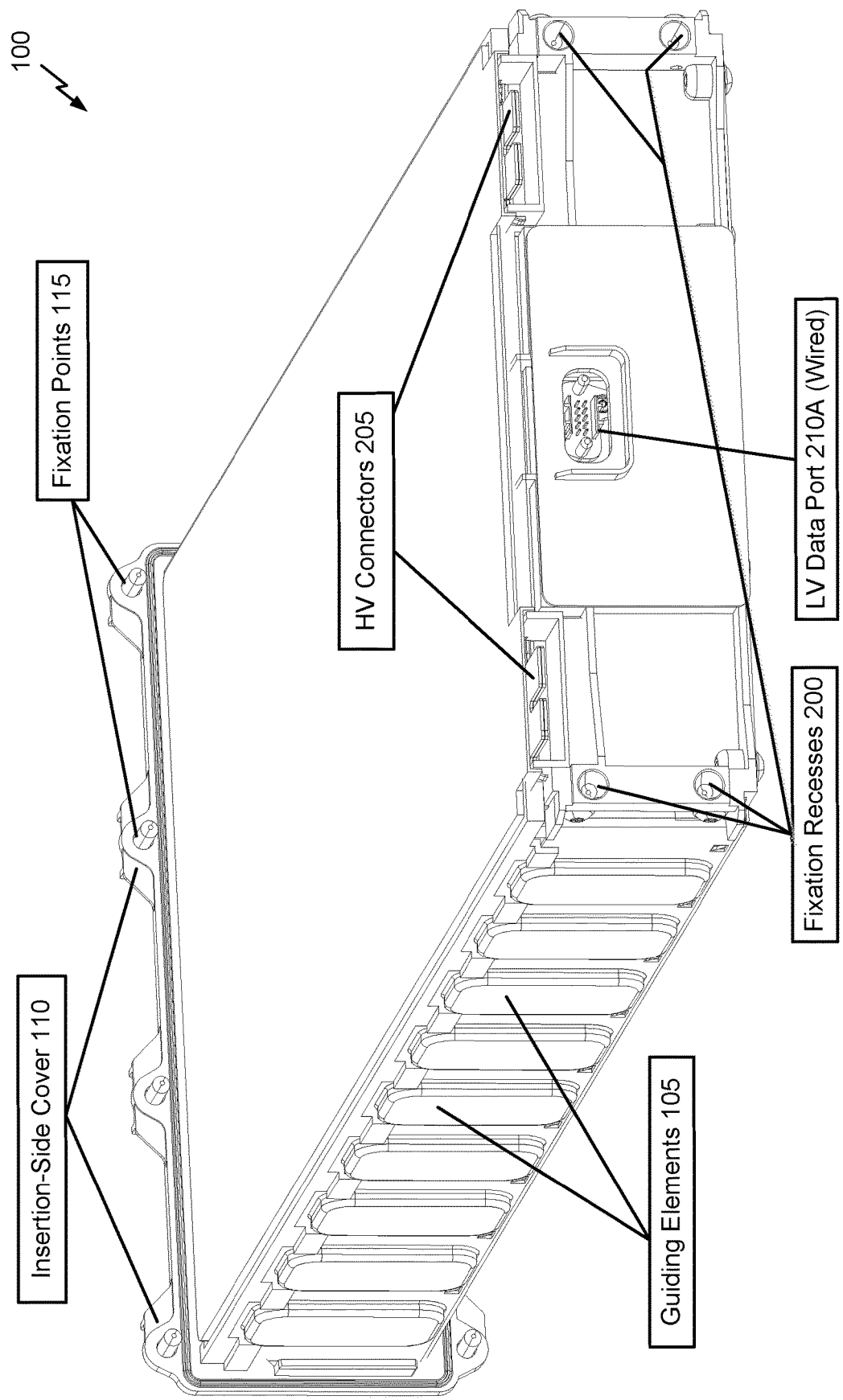
FIGS. 2A-2B illustrates alternative back-perspectives of the exterior framing of the battery module of FIG. 1 in accordance with an embodiment of the disclosure.
Figure 2B:
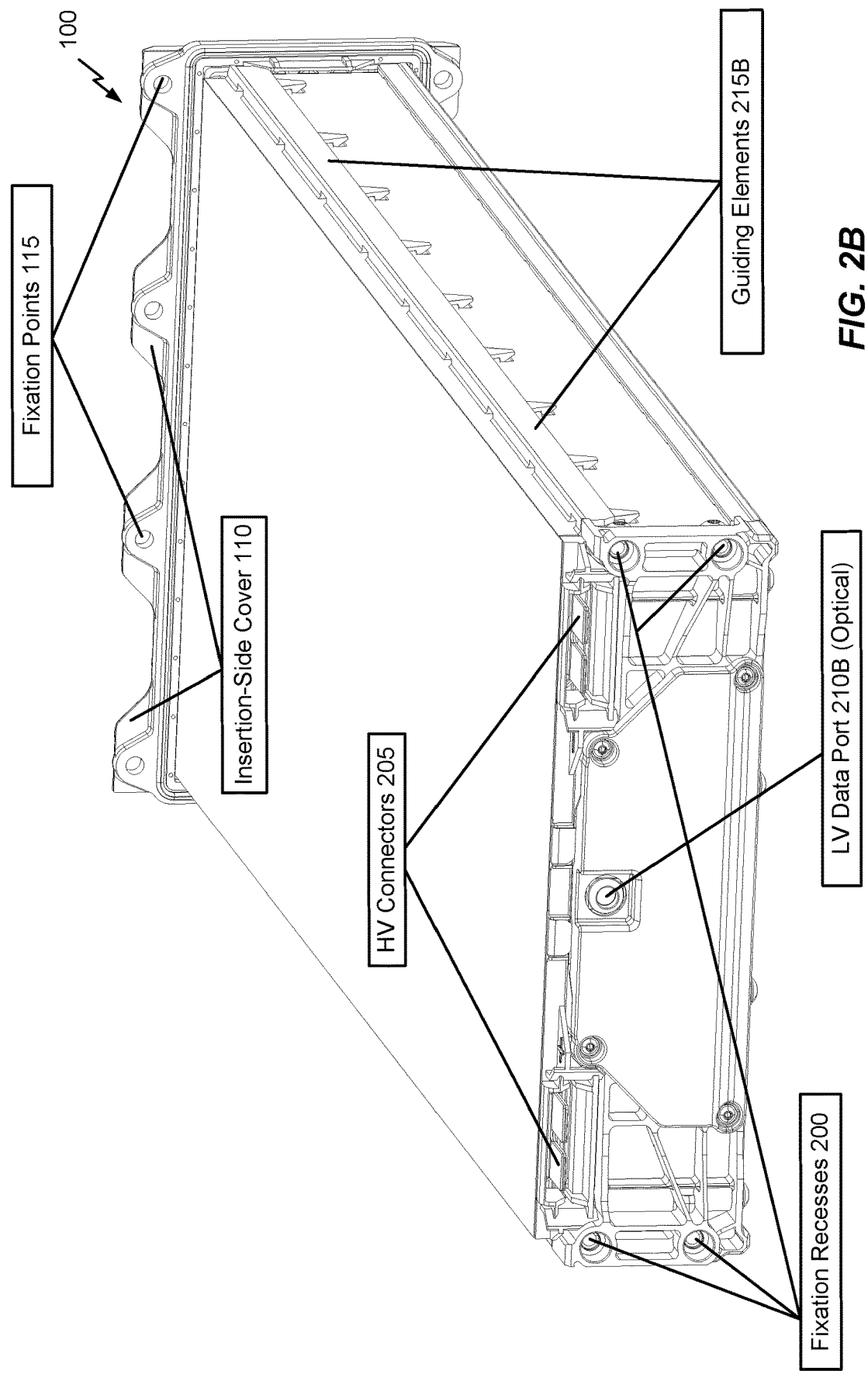

FIG. 1 illustrates a front-perspective of an exterior framing of a battery module 100 in accordance with an embodiment of the disclosure. FIGS. 2A-2B illustrate alternative rear-perspectives of the exterior framing of the battery module 100 in accordance with embodiments of the disclosure. In the examples of FIGS. 1-2B, the battery module 100 is configured for insertion into a battery module compartment. For example, in FIGS. 1-2B, each side of the battery module 100 includes guiding elements 105 or 215B to facilitate insertion into (and/or removal out of) the battery module compartment. In a further example, the guiding elements 105 or 215B are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, etc.) to seal the battery module 100 inside the battery module compartment using a cover (or endplate) integrated sealing system (e.g., rubber ring, paper gasket, sealant adhesive, etc.). While the insertion-side cover 110 is depicted in FIGS. 1-2B as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIGS. 1-2B, the insertion-side cover 110 includes fixation points 115, a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100).

In an alternative embodiment, the fixation points 115 and associated flange can be omitted, and a different fixation mechanism (e.g., a clip or clamp, such as a U-shaped clip) can be used to secure the battery module 100 inside a respective battery module compartment. For example, the insertion-side cover 110 may be clamped over the open insertion-side of the battery module compartment with a sheet metal band. The "band" may be rolled over the insertion-side cover 110 to cover part of the top and bottom of the battery housing, after which the rolled band is clamped (e.g., with a U-shaped clip). In an example, as a security feature, removing the rolled band so as to detach the insertion-side cover 110 may cause the rolled band to be damaged, such that unauthorized battery module removal can be detected (e.g., to void a vehicle warranty, etc.).

Referring to FIGS. 2A-2B, the battery module 100 further includes a set of fixation and positioning elements 200 (e.g., to position and secure the battery module 100 in the battery module compartment while inserted), and a set of HV connectors 205 (e.g., corresponding to positive and negative terminals of the battery module 100, each of which may be connected to (e.g., plugged into, bolted or screwed to, etc.) an electrical interface that is coupled to either the BJB or another battery module). In FIG. 2A, the battery module includes a wired LV data port 210A (e.g., to connect internal sensors of the battery module 100 to the BJB (not shown in FIG. 2A) via a wired LV module-to-tunnel interface (not shown in FIG. 2A) in the battery module compartment). In FIG. 2B, the battery module includes an optical LV data port 210B (e.g., to connect internal sensors of the battery module 100 to the BJB (not shown in FIG. 2B) via an optical LV module-to-tunnel interface (not shown in FIG. 2B) in the battery module compartment, such as a light tube). In an example, the optical LV data port 210B, upon insertion of the battery module 100 into the battery module compartment, may be pressed against the optical LV module-to-tunnel interface (not shown in FIG. 2B) so that optical signals can be exchanged with the BJB through light tube(s) in the tunnel space without collecting dust or other debris. Accordingly, the battery module 100 is configured such that, upon insertion into the battery module compartment, the fixation and positioning elements 200, and the HV connectors 205 and the LV data port 210A or 210B are each secured and connected (e.g., plugged into, or pressed against and sealed) corresponding connectors in the battery module compartment. As used herein, reference to "LV" and "HV" is used to distinguish between data connections (i.e., LV) and power connections (i.e., HV). Generally, power connections are associated with higher voltages (e.g., suitable for powering a drive motor of an electric vehicle), while data connections are associated with lower voltages (e.g., suitable for transporting data).

Various embodiments of the disclosure described herein relate to module-to-module power connectors between battery modules (e.g., such as the battery module 100 of FIGS. 1-2B) of an energy storage system. As will be described below, module-to-module power connectors may be arranged in part within a tunnel space that is defined above a battery module mounting area, while also including electrical interfaces (e.g., plugs or sockets) that extend downwards into the battery module mounting area for establishing electrical connections with HV connectors (e.g., HV connectors 205 in FIGS. 2A-2B). In an example, module-to-module power connectors may be used to connect at least one pair of battery modules in adjacent battery module compartments together in series.

Figure 3A:
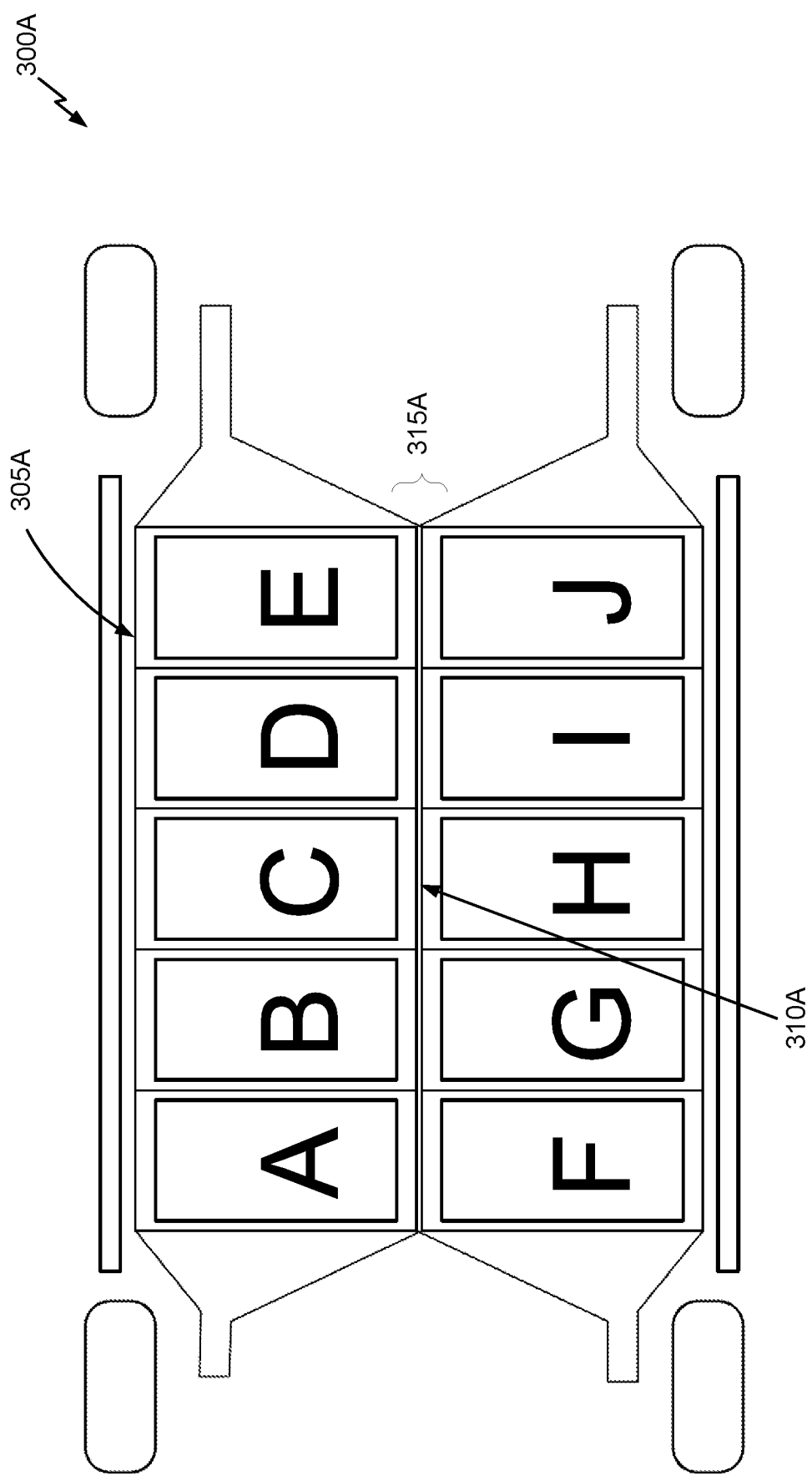
FIG. 3A illustrates a top-perspective of a cross-section of an electric vehicle including a battery housing in accordance with an embodiment of the disclosure.

FIG. 3A illustrates a top-perspective of a cross-section of an electric vehicle 300A including a battery housing 305A in accordance with an embodiment of the disclosure. FIG. 3A depicts various well-known components (e.g., wheels, axles, etc.) of the electric vehicle 300A to provide general context, but these components are not described in detail below for the sake of brevity. With respect to FIG. 3A and other FIGS described below, reference to battery "housing" and battery "module mounting area" is somewhat interchangeable. The battery module mounting area in FIG. 3A (and other FIGS described below) refers to an arrangement of battery module compartments configured to receive insertion of battery modules and to be sealed via insertion-side covers to form a battery housing. Further, in at least one embodiment, the battery module mounting area is part of a floor of the electric vehicle 300A.

Referring to FIG. 3A, the battery housing 305A includes ten battery module compartments denoted as A . . . J, and a middle bar 310A that is positioned between battery module compartments A . . . E and battery module compartments F . . . J on different longitudinal sides (e.g., left and right sides) of the electric vehicle 300A. Each battery module compartment includes a frame (or plurality of walls) defining an interior space configured to fit a respective battery module, and an insertion-side which may be opened to facilitate insertion and/or removal of the respective battery module. The middle bar 310A may be constructed from the dividers (or firewalls) that separate laterally adjacent (e.g., aligned width-wise as a left/right pairing in the electric vehicle 300A) battery module compartments A . . . J (e.g., the firewall between battery module compartments A and F, the firewall between battery module compartments B and G, etc.).

In an example, the middle bar 310A may be one single longitudinal "bar" that extends across the entirety of the battery housing 305A. In this case, the interior side-walls of each battery module compartment may be attached to the middle bar 310A to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area, as will be discussed below with respect to FIGS. 6A-6B. In this case, the middle bar 310A is an aggregation of the individual firewalls contained in each respective battery module compartment chamber across the battery housing 305A.

While the middle bar 310A is illustrated in FIG. 3A as being centered in the battery housing 305A, the middle bar 310A can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules when inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 305A), with the two separate middle bars either corresponding to two long "bars" extending across the battery housing 305A or two aggregations of chamber-specific firewalls from longitudinally stacked battery module compartment chambers. In at least one embodiment, the gap between the two separate middle bars may be used as a tunnel space (e.g., to facilitate optical communication, to run LV/HV busbars, etc.), although the embodiments describe below relate to an implementation where the tunnel space is defined above the battery module compartments, and not in a gap between laterally adjacent battery module compartments.

It will be appreciated that the battery housing 305A including ten battery module compartments A . . . J is shown in FIG. 3A for example purposes only. For example, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.). The battery module compartments A . . . E are arranged longitudinally (i.e., lengthwise with respect to electric vehicle 300A) on a right-side of the electric vehicle 300A, while battery module compartments F . . . J are arranged longitudinally on a left-side of the electric vehicle 300A.

As used herein, a "battery module" is a package that contains a plurality of battery cells, such as lithium ion battery cells or battery cells made from a different electrode material. Battery modules may be configured with a prismatic or pouch battery cell arrangement (sometimes referred to as a soft pack), while other battery modules are configured with a cylindrical battery cell arrangement.

As used herein, a battery module compartment being "sealed" refers to a seal that is at least water-tight or liquid-tight, and optionally gas-tight (at least, with respect to certain gases and/or particles such as smoke from fire, carbon, electrolyte particles, dust and debris, etc.). Generally, the sealing of the battery module compartments is a result of its interior walls being welded or glued together (where possible), and any electrical interfaces (e.g., insertion-side cover, coolant interface plugs, electrical interfaces, etc.) being sealed with a suitable type of sealant (e.g., O-ring, rubber gasket, sealing compound, etc.). While the sealing of the battery module compartments could potentially be hermetic (e.g., gas-tight with respect to all gases), hermetic sealing is not necessary (e.g., due to high cost). Accordingly, the sealing of the battery module compartments may be configured to block propagation of likely contaminants (e.g., liquids such as water, flames and/or smoke from fires, carbon, electrolyte particles, dust and debris, etc.) from entering into battery module compartments from an external environment and/or from exiting the battery module compartments towards a protected area (e.g., a passenger cabin of an electric vehicle). Moreover, while various embodiments described below relate to lateral or side-insertion of battery modules into respective battery module compartments, the insertion-side for the battery module compartments A . . . J may vary between different battery module mounting area configurations.

Referring to FIG. 3A, the middle bar 310A is configured to increase the overall stiffness of the battery housing 305A (and thereby, the electric vehicle 300A). In an example, the middle bar 310A may be positioned underneath a tunnel space 315A that, similar to the middle bar 310A, may be centered between battery module compartments A . . . E and battery module compartments F . . . J. As noted above, the battery module compartment firewalls that comprise the middle bar 310A limit propagation of hazards (e.g., excessive heat or fire, fluid leaks, etc.) between battery module compartments A . . . E and battery module compartments F . . . J. The tunnel space 315A optionally permits wireless communication (e.g., optical communication) between the battery modules inserted into the battery compartments A . . . J and the BJB (not shown in FIG. 3A). In an example, the tunnel space 315A may be outside of the battery module compartments A . . . J and effectively on 'top' of the battery housing 305A in the middle of the electric vehicle 300A (e.g., along the top of middle bar 310A). Alternatively, instead of being defined over, or on 'top', of the battery housing 305A, the tunnel space 315A may instead be vertically aligned (or level) with the battery modules A . . . J in the battery housing 305A in-between adjacent battery module compartments on different lateral sides of the electric vehicle 300A (e.g., two interior walls or firewalls are used to seal each pair of laterally adjacent battery module compartments, with spaces in-between each pair of laterally adjacent battery module compartments defining the tunnel space 315A).

While not shown expressly in the top-perspective depicted in FIG. 3A, busbars contained within respective module-to-module power connectors may be deployed along the tunnel space 315A to provide electrical connections between battery modules inserted into any of the battery module compartments A . . . J and a BJB.

Figure 3B:
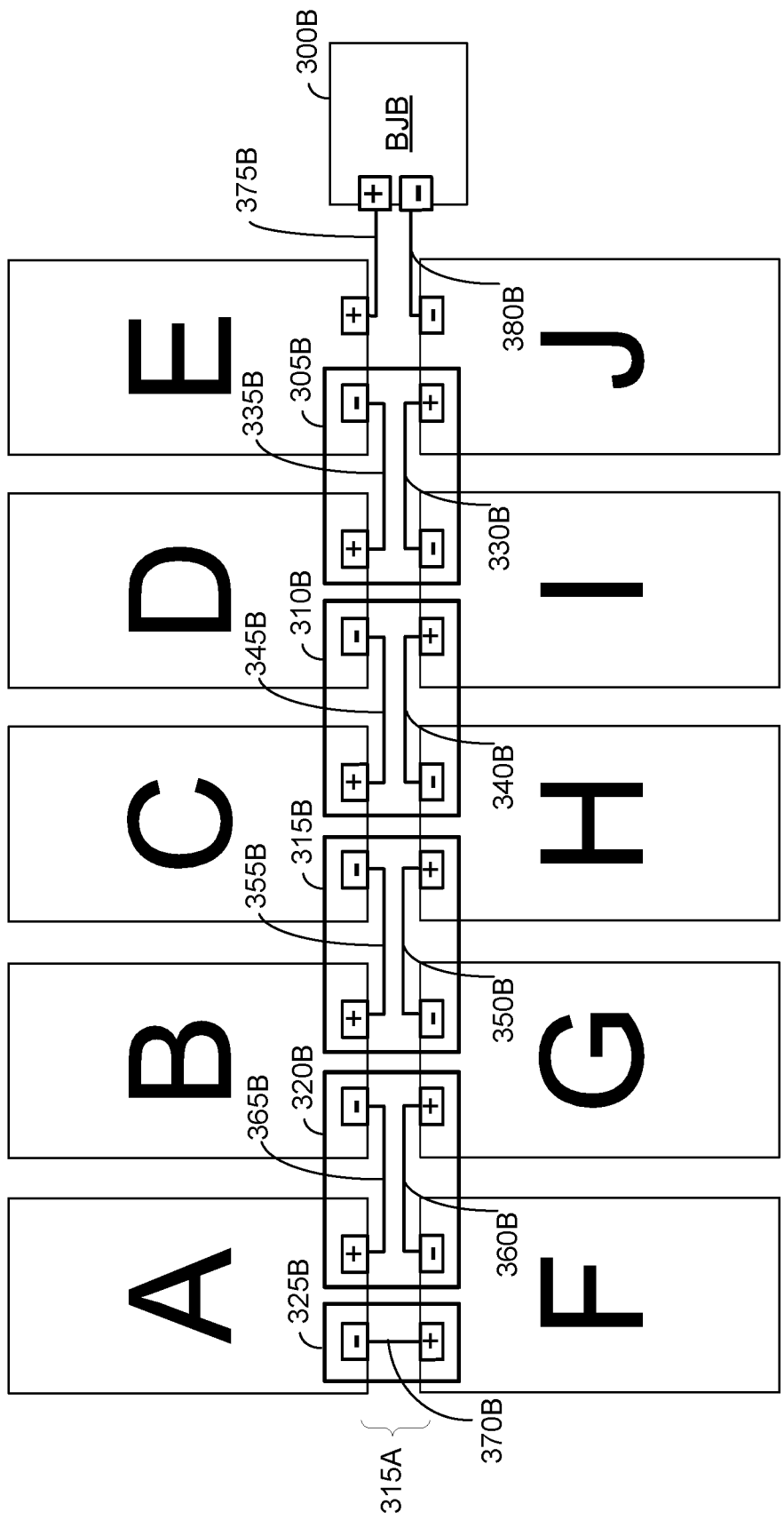
FIG. 3B illustrates an electrical diagram from a top-perspective of a cross-section of the electric vehicle of FIG. 3A in accordance with an embodiment of the disclosure.

FIG. 3B illustrates an electrical diagram from a top-perspective of a cross-section of the electric vehicle 300A in accordance with an embodiment of the disclosure. Referring to FIG. 3B, a BJB 300B is arranged at one end of the tunnel space 315A near battery module compartments E and J. A negative terminal at the BJB 300B may connect to an electrical interface on battery module compartment J via an HV busbar (e.g., a sealed HV busbar), which is connected to a negative terminal of a battery module in battery module compartment J. A positive terminal of the battery module in battery module compartment J in turn connects to an electrical interface on battery module compartment J, which connects to an HV busbar that connects to an electrical interface on battery module compartment I, which is connected to a negative terminal of a battery module in battery module compartment I, and so on. In this manner, the battery module in battery module compartment J may be daisy-chained in series to the battery module in battery module compartment I, which is in turn daisy-chained (in order) to battery modules in battery module compartments H, G, F, A, B, C, D and E, with the positive terminal of the battery module in battery module compartment E being connected back to the BJB 300B via an HV busbar to complete the HV power connection between the BJB 300B and the respective battery modules of the battery housing 305A.

Referring to FIG. 3B, the electrical interfaces and associated busbars that are used to form electrical connections between battery modules in adjacent battery module compartments are integrated into module-to-module power connectors 305B-325B. In FIG. 3B, module-to-module power connectors 305B-320B are implemented as "paired" module-to-module power connectors in the sense that two separate busbars are included to form two separate in-series module-to-module electrical connections. For example, module-to-module power connector 305B includes a first busbar that facilitates an in-series electrical connection between battery modules in battery module compartments I and J, and also a second busbar that facilitates an in-series electrical connection between battery modules in battery module compartments D and E. In an example, the respective busbars in each "paired" module-to-module power connector are insulated from each other as each respective busbar is configured to connect a different pair of battery modules in series. By contrast, module-to-module power connector 305B-320B is implemented as a "single" module-to-module power connector in the sense that a single busbar is included to form a single in-series module-to-module electrical connection between battery modules in battery module compartments A and F.

Referring to FIG. 3B, module-to-module power connectors 305B-320B are each configured to connect battery modules in longitudinally-adjacent battery module compartments on the same longitudinal side of the battery housing 305A. For example, module-to-module power connector 305B is configured to connect battery modules in longitudinally-adjacent battery module compartments I and J in series and also to separately connect battery modules in longitudinally-adjacent battery module compartments D and E in series. By contrast, module-to-module power connector 325B is configured to connect battery modules in laterally-adjacent battery module compartments A and F in series.

Referring to FIG. 3B, each of the module-to-module power connectors 305B-325B may include one or more busbars (e.g., HV busbars) for transporting power between battery modules in adjacent battery module compartments. In FIG. 3B, these busbars are denoted as 330B-370B. In an example, some or all of the busbars 330B-370B may include an integrated disconnect component. Each of the integrated disconnect components is part of or affixed to a respective busbar in a module-to-module power connector, and is configured to reduce or eliminate a voltage across a respective electrical connection in response to a trigger (e.g., a surge in current, heat, etc., which may be caused in a crash scenario). As will be described below in more detail, the integrated disconnect components may include fuses, explosive components (e.g., pyro fuses, etc.), or the like. Also depicted in FIG. 3B are HV busbars 375B-380B. HV busbars 370B-380B each connect a single battery module to the BJB 300B, and thereby may be characterized as part of module-to-BJB power connectors instead of module-to-module power connectors. Similar to the module-to-module power connectors described above, the HV busbars 370B-380B in the module-to-BJB power connectors may be sealed.

While not shown in FIG. 3B, each battery module compartment may also include an LV module-to-tunnel interface (e.g., an optical communications interface, a wired communications interface, etc.) which facilitates a connection between the battery module and the BJB 300B.

In an example, centering the busbars (e.g., HV busbars 330B-380B and/or LV busbars) along the tunnel space 315A in the middle of the electric vehicle 300A helps to isolate the busbars from crash impact zones (e.g., the left and right sides of the electric vehicle 300A), which in turn protects the busbars from crash impact-related damage. Also, defining the tunnel space 315A on top of the middle bar 310A, which may be configured as a strong metal 'spine' of the battery housing 305A, may likewise help to protect the busbars with the tunnel space 315A functioning as a relatively protected area (e.g., from crash impact-related damage, etc.). The tunnel space 315A may also function as an electromagnetic shield that protects the busbars from external electromagnetic interference. In an example, the busbars may be attached to a top-portion of the battery module compartments in proximity to the firewall(s), so that the tunnel space 315A remains substantially empty, which may facilitate LV busbars or an optical communications interface to be deployed therein. The central busbars may include LV (or data) busbars (not shown) and HV (or power) busbars (e.g., busbars 330B-380B), as noted above, although the LV busbars may be omitted if an optical communications interface (e.g., a light tube) is implemented (e.g., because LV wiring is not required to communicate with the individual battery modules).

With respect to the embodiment whereby the tunnel space 315A is defined on 'top' of the battery housing 305A, in an example, each pair of laterally adjacent battery module compartments may include a set of holes located proximately to the tunnel space 315A and aligned perpendicular to a direction in which the battery module is inserted or removed (e.g., for lateral or side-insertion, the holes may be on an upper wall or top wall of the battery module compartment). Electrical interfaces of the module-to-module power connector(s) are mounted into respective hole(s) among the set of holes for connecting battery modules to the busbars 330B-370B in the tunnel space 315A. For example, each module-to-module power connector may be mounted in the tunnel space 315A on top of the battery housing 305A, with respective electrical interfaces extending downwards and being inserted into one or more respective holes, and then secured and sealed. Then, when a battery module is inserted into a battery module compartment, electrical interfaces (e.g., plugs, sockets, etc.) for positive and negative terminals of the battery module are aligned with the electrical interfaces (e.g., plugs, sockets) on the module-to-module power connector(s), such that the electrical interfaces of the battery module are coupled to the electrical interfaces on the module-to-module power connector(s) upon full insertion into the battery module compartment, and the electrical interfaces of the battery module are disconnected (or decoupled) from the on the module-to-module power connector(s) when the battery module is removed from the battery module compartment. Alternatively, instead of an implementation where the battery modules are plugged into module-to-module power connector(s) upon insertion, the HV busbars in the module-to-module power connectors could instead manually secured to the electrical interface(s) on the battery modules. For example, an HV busbar could be bolted to an electrical interface on a battery module and then covered or sealed via a separate cover. In this case, the electrical interface of the module-to-module power connector to the battery module would correspond to the portion of the HV busbar that is bolted onto the battery module's electrical interface (e.g., in contrast to a plug/socket mechanism for forming electrical connections between the module-to-module power connectors and battery modules).

In an example, the electrical interfaces on the module-to-module power connector(s) may interface with battery modules on both sides of the battery module mounting area. For example, module-to-module power connector 305B connects battery modules in battery module compartments I and J in series on one longitudinal side of the battery housing 305A, while also connecting battery modules in battery module compartments D and E in series on the other longitudinal side of the battery housing 305A. The electric couplings of the battery modules can be chained from battery module compartment to battery module compartment with HV being available at the BJB 300B once a last battery module is inserted (e.g., each of battery module compartments A . . . J).

The electrical interfaces on each module-to-module power connector 305B-325B may be sealed (e.g., via a plastic cover, a rubber gasket, a sealing adhesive, a sealing ring such as an O-Ring in an axial or a radial direction, etc.) so that each battery module compartment is sealed from an external environment (e.g., so that no liquid can entered into or escape from the battery housing 305A once all the battery module compartments are closed). In an example, this sealing is not applied between the battery modules that are electrically connected via the electrical interfaces of the module-to-module power connectors 305B-325B (e.g., gaps may be defined inside the module-to-module power connectors 305B-325B to permit airflow between the respective adjacent battery modules). In an example, the module-to-module power connectors 305B-325B may be secured onto the top of the battery housing 305A in the tunnel space 315A via bolting or screwing.

In an example, positioning the module-to-module power connectors 305B-325B on the battery housing 305A in the tunnel space 315A may permit workers (e.g., assembly workers at a vehicle assembly plant during assembly of the electric vehicle 300A, maintenance workers, etc.) access to a particular subset of battery module compartments without being exposed to dangerously high voltages. For example, as noted above, the busbars 330B-370B of the respective battery module compartments may be positioned in an interior or central portion of the electric vehicle 300A, while the workers may be located outside the electric vehicle 300A for a lateral module insertion scenario, thereby shielded from the centrally-positioned busbars 330B-370B.

In particular, during insertion of a battery module that includes an integrated cover (or endplate), the worker may insert the battery module into a battery module compartment and couple the battery module to at least one corresponding busbar (e.g., via electrical interfaces of one or more module-to-module power connectors, where the battery module coupling may occur by virtue of the worker pushing or sliding an electrical interface of the battery module into the corresponding electrical interfaces of one or more module-to-module power connectors), and then secure (e.g., by tightening bolts, etc.) the cover (or endplate) to the battery module compartment so that the battery module compartment is sealed. Likewise, during removal, the worker may free or unlock the cover attachment mechanism (e.g., by removing bolts, etc.), and may then slide the battery module out of the battery module compartment. Hence, in at least one embodiment, during either insertion or removal, the worker only accesses the battery module(s) inside one particular subset of battery module compartments and its associated busbar(s) at a time without exposing the workers to the central HV busbars 330B-370B.

In an embodiment, the BJB 300B may also be positioned in a middle or center (laterally) at one longitudinal end of the electric vehicle 300A on top of the battery housing 305A. For example, to simplify and/or shorten power cabling and improve safety, the BJB 300B may be positioned at one longitudinal end of the battery housing 305A above the battery module compartments E and J, or alternatively at the other longitudinal end of the battery housing 305A above the battery module compartments A and F). In an example, positioning the BJB 300B in the middle (laterally) of the electric vehicle 300A above the tunnel space 315A may reduce an electrical connection length between the BJB 300B and the battery modules due to the busbars 330B-370B being run along the tunnel space 315A. However, it will be appreciated that the BJB 300B can be placed anywhere in the electric vehicle 300A and is not required to be installed proximately to the battery housing 305A at the precise location depicted in FIG. 3B.

The battery housing 305A described above with respect to FIGS. 3A-3B may be based on various battery module mounting area configurations, such as a lateral-inserted battery module mounting area configuration (e.g., battery modules are inserted into a battery module mounting area from the left and right sides of an electric vehicle) which is used to describe various embodiments below. However, while not expressly illustrated, other battery module mounting area configurations are possible, such as vertically-inserted battery module mounting area configurations (e.g., battery modules are inserted into a battery module mounting area from the top or bottom sides of an electric vehicle), hinged-inserted battery module mounting area configurations (e.g., battery module compartments are attached to hinges so that the battery module compartments rotate upwards and downwards via the hinges for battery module insertion), and so on.

Figure 3C:
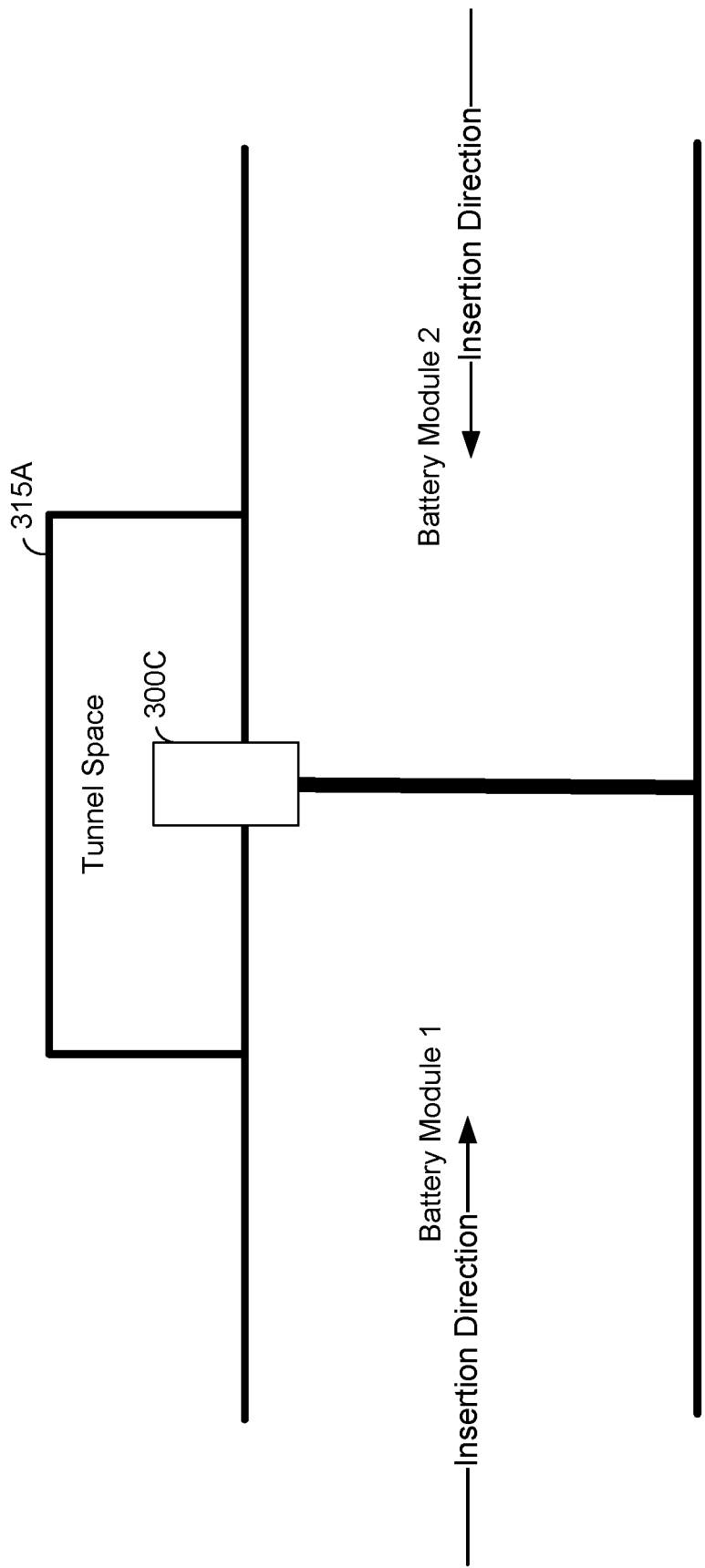
FIG. 3C illustrates a side-perspective of laterally adjacent battery modules being coupled to a module-to-module power connector in accordance with an embodiment of the disclosure.

FIG. 3C illustrates a side-perspective of laterally adjacent battery modules 1 and 2 being coupled to a module-to-module power connector 300C in accordance with an embodiment of the disclosure. In an example, module-to-module power connector 300C may correspond to any of the module-to-module power connectors 305B-325B from FIG. 3B. The example of FIG. 3C is specific to a lateral-inserted battery module mounting area configuration whereby the tunnel space 315A is positioned on top of the battery housing 305A. In FIG. 3C, the laterally adjacent battery modules 1 and 2 may be connected to each other in series as shown in FIG. 3B with respect to the battery modules in battery module compartments A and F by the module-to-module power connector 325B. Alternatively, the laterally adjacent battery modules 1 and 2 may be insulated from each other within the module-to-module power connector 300C and connected in series to other battery modules (not shown in FIG. 3C), as shown in FIG. 3B with respect to the module-to-module power connectors 305B-325B.

Figure 4A:
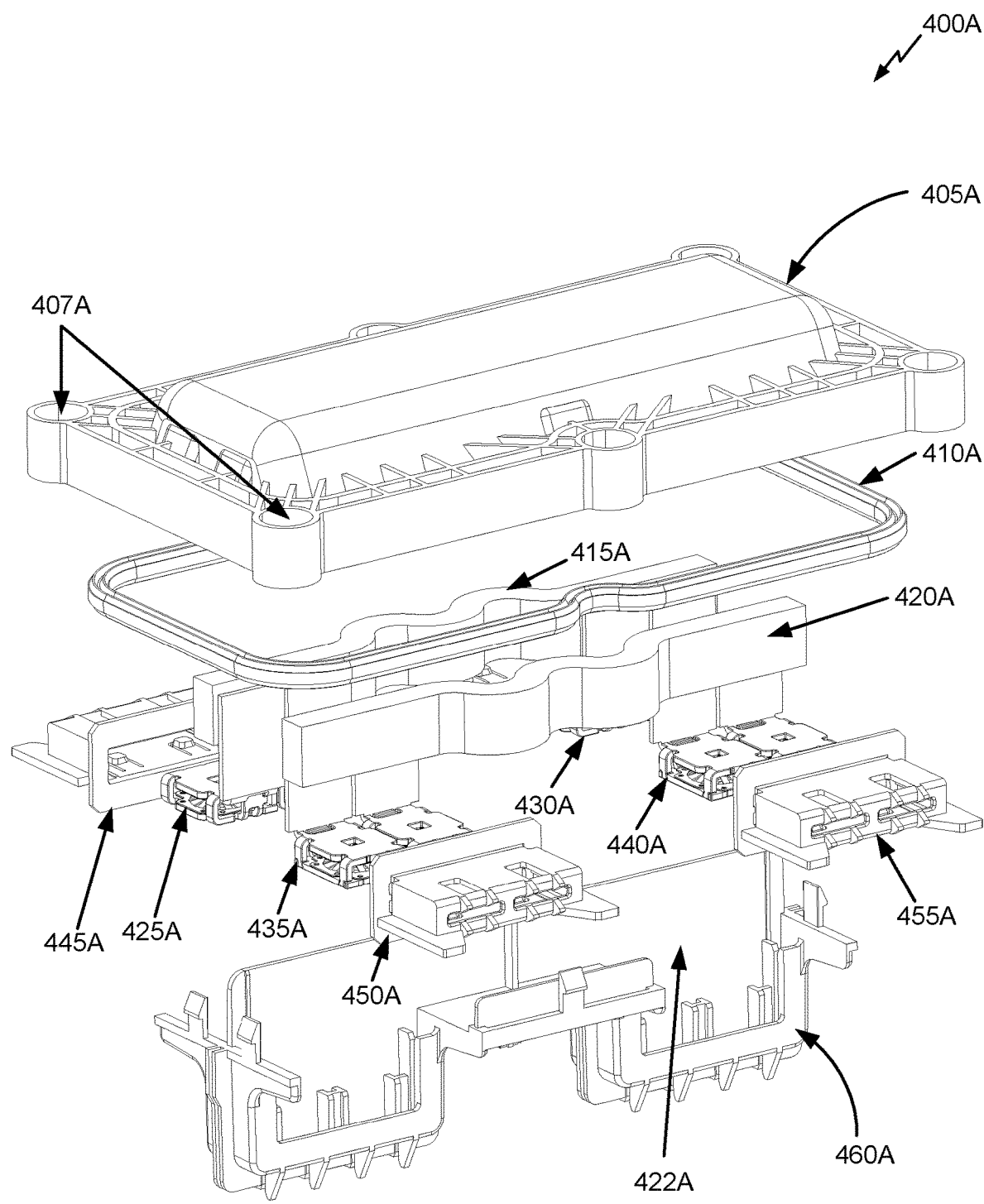
FIGS. 4A-4J illustrates various perspectives of a module-to-module power connector in accordance with an embodiment of the disclosure.

FIG. 4A illustrates an exploded perspective of a module-to-module power connector 400A in accordance with an embodiment of the disclosure. In an example, module-to-module power connector 400A may correspond to any of the module-to-module power connectors 305B-320B from FIG. 3B.

Referring to FIG. 4A, the module-to-module power connector 400A includes a top cover 405A (e.g., made from plastic and including a number of fixation points such as fixation points 407A for securing the module-to-module power connector 400A to the top of the battery housing 305A via bolts), a sealing component 410A (e.g., sealing compound, rubber, etc.), busbars 415A and 420A (e.g., made from a conductive material such as copper), electrical interfaces 425A and 430A coupled to busbar 415A, electrical interfaces 435A and 440A coupled to busbar 420A, electrical interface covers 445A-455A (e.g., made from plastic) configured to cover electrical interfaces 425A, 435A and 440A, respectively, and a battery housing fitting 460A (e.g., made from plastic). As will be described below in more detail, the battery housing fitting 460A is configured for insertion into holes in a top-side of the battery housing 305A inside of the tunnel space 315A. Moreover, the battery housing fitting 460A includes an insulative divider section 422A that helps to insulate busbars 415A and 420A from each other. While not shown in the exploded perspective of FIG. 4A, the electrical interface 430A also includes an electrical interface cover.

Referring to FIG. 4A, electrical interfaces 425A and 430A are used to form an electrical connection between a pair of battery modules in longitudinally adjacent battery module compartments, and electrical interfaces 435A and 440A are used to form an electrical connection between another pair of battery modules in longitudinally adjacent battery module compartments.

Referring to FIG. 4A, in an example, if the module-to-module power connector 400A corresponds to the module-to-module power connector 305B from FIG. 3B, electrical interface 425A may be used to connect to the electrical interface on the battery module in battery module compartment D, electrical interface 430A may be used to connect to the electrical interface on the battery module in battery module compartment E, electrical interface 435A may be used to connect to the electrical interface on the battery module in battery module compartment I, and electrical interface 440A may be used to connect to the electrical interface on the battery module in battery module compartment J.

Figure 4B:
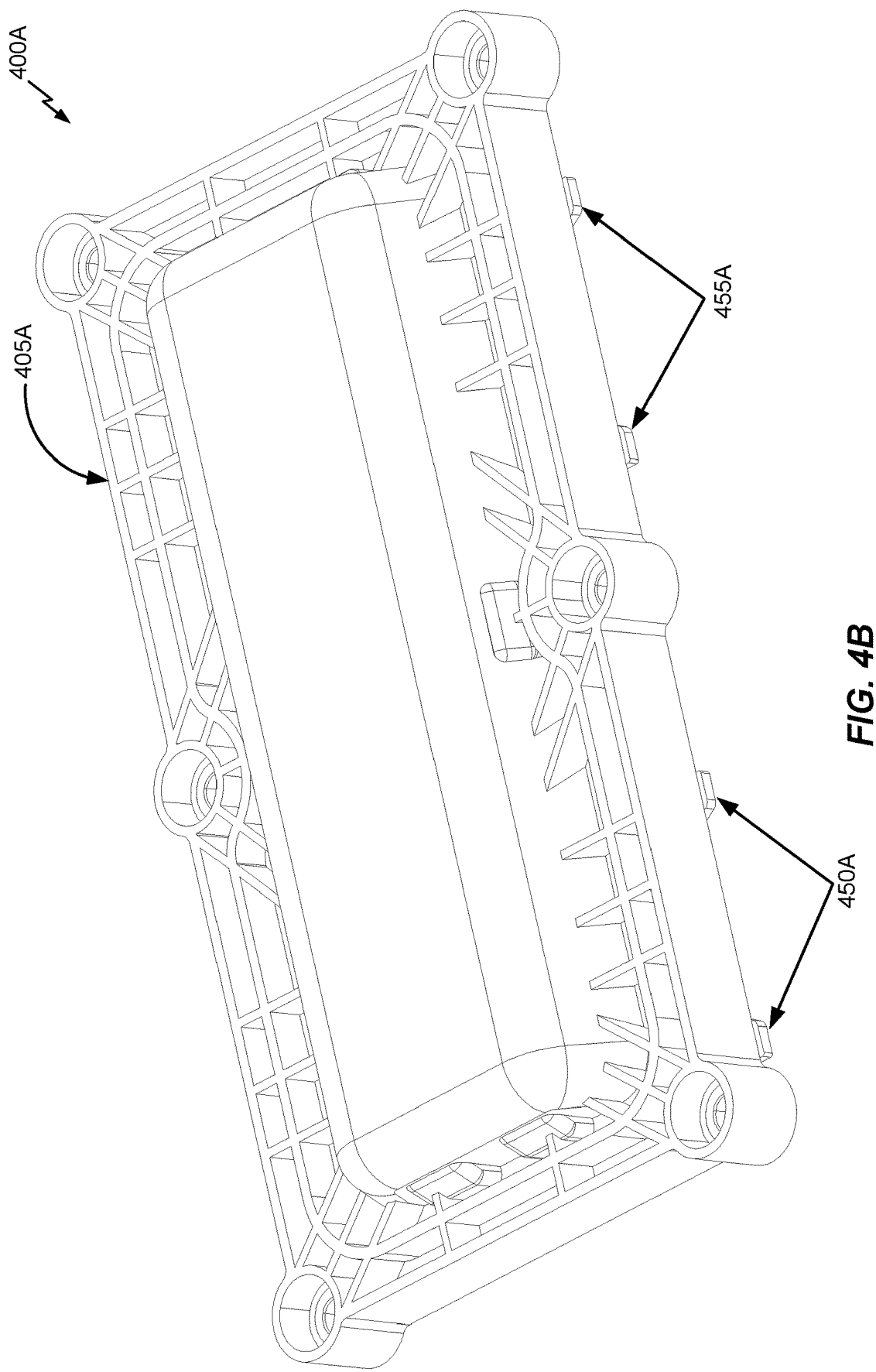

FIG. 4B illustrates the module-to-module power connector 400A in accordance with another embodiment of the disclosure. Specifically, the perspective in FIG. 4B primarily depicts the top cover 405A, with portions of the electrical interface covers 450A and 455A also being visible.

Figure 4C:
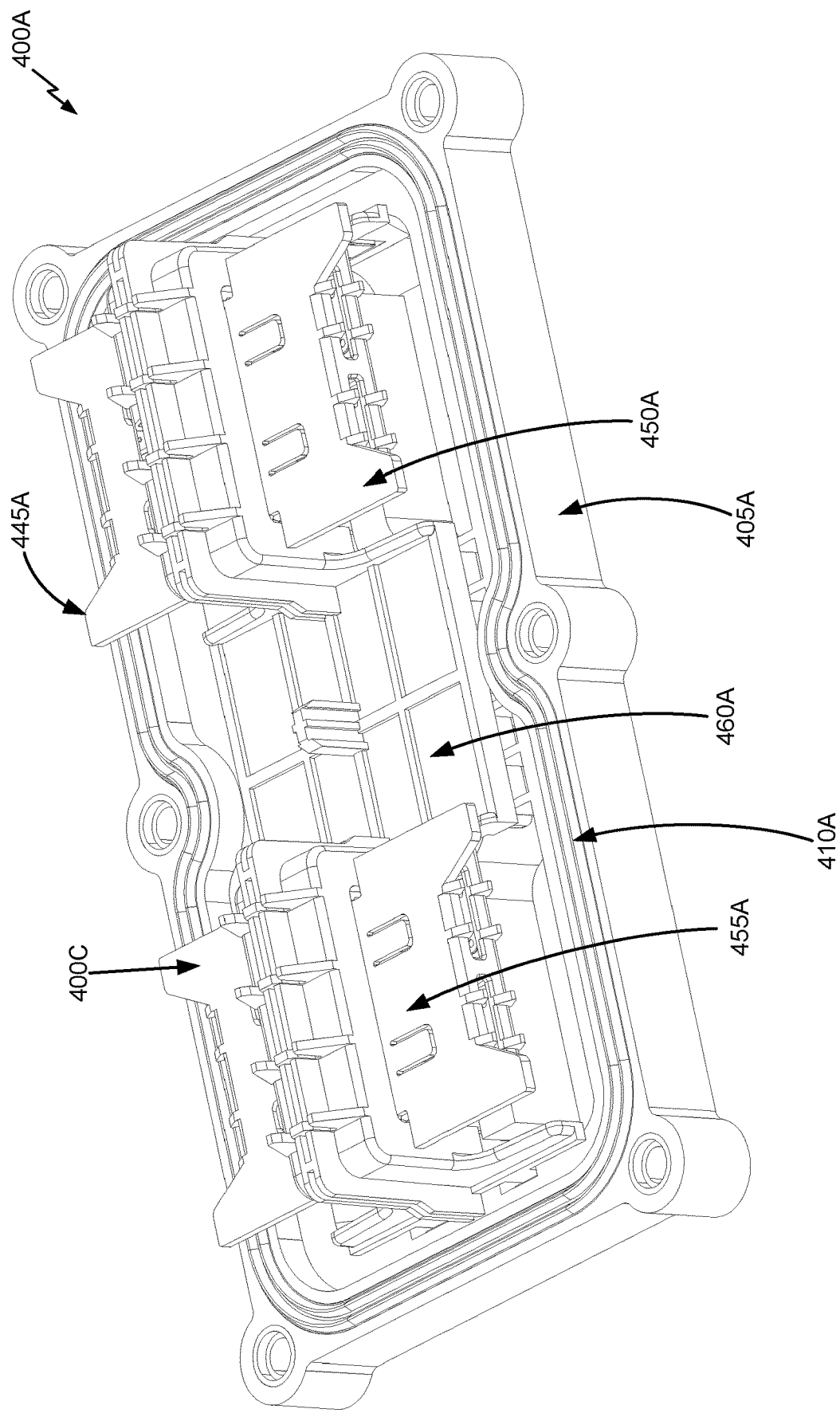

FIG. 4C illustrates the module-to-module power connector 400A in accordance with another embodiment of the disclosure. Specifically, the perspective in FIG. 4C more clearly shows the underside components of the module-to-module power connector 400A, whereby electrical interface cover 400C (which covers electrical interface 430A in FIG. 4A) is shown.

Referring to FIGS. 4A-4C, the busbars 415A and 420A and the battery housing fitting 460A are configured to extend downwards into the battery module mounting area for connecting to the respective battery modules. Accordingly, the electrical interfaces 425A-440A and associated electrical interface covers 445A-455A and 400C are arranged inside of the battery housing 305A (e.g., beneath the tunnel space 315A). Alternatively, while various embodiments show the battery module mounting area beneath the tunnel space 315A, other embodiments need not have the tunnel space 315A arranged on top of the battery module mounting area. For example, the tunnel space 315A could instead be implemented in-between the laterally adjacent battery module compartments, in which case the electrical interfaces would extend laterally (instead of downwards) from the tunnel space into the battery module compartments. In yet another embodiment, the tunnel space could be arranged beneath the battery housing 305A with bottom-mounted module-to-module power connectors having electrical interfaces that extend into the battery housing 305A in an upwards direction from beneath the battery housing 305A. Accordingly, a tunnel space positioned on top of the battery housing 305A with downward-extending electrical interfaces from the module-to-module power connectors is not required in all embodiments.

Referring to FIGS. 4A-4C, when the module-to-module power connector 400A is mounted in the tunnel space 315A and secured (e.g., via screwing, bolting, etc.), the sealing component 410A is pressed down onto the battery housing 305A, which seals the module-to-module power connector 400A from an external environment (e.g., the rest of the tunnel space 315A, etc.).

Referring to FIGS. 4A-4C, each of the electrical interfaces 425A-440A is configured to connect to either a positive or negative terminal of a corresponding battery module upon insertion of the battery module in accordance with the electrical diagram depicted in FIG. 3B with respect to module-to-module power connectors 305B-320B. As noted above, the busbars 415A-420A are insulated from each other by the insulative divider section 422A and are configured to form two separate in-series electrical connections between battery modules of adjacent battery module compartments upon insertion of the battery modules into the respective adjacent battery module compartments.

Figure 4D:
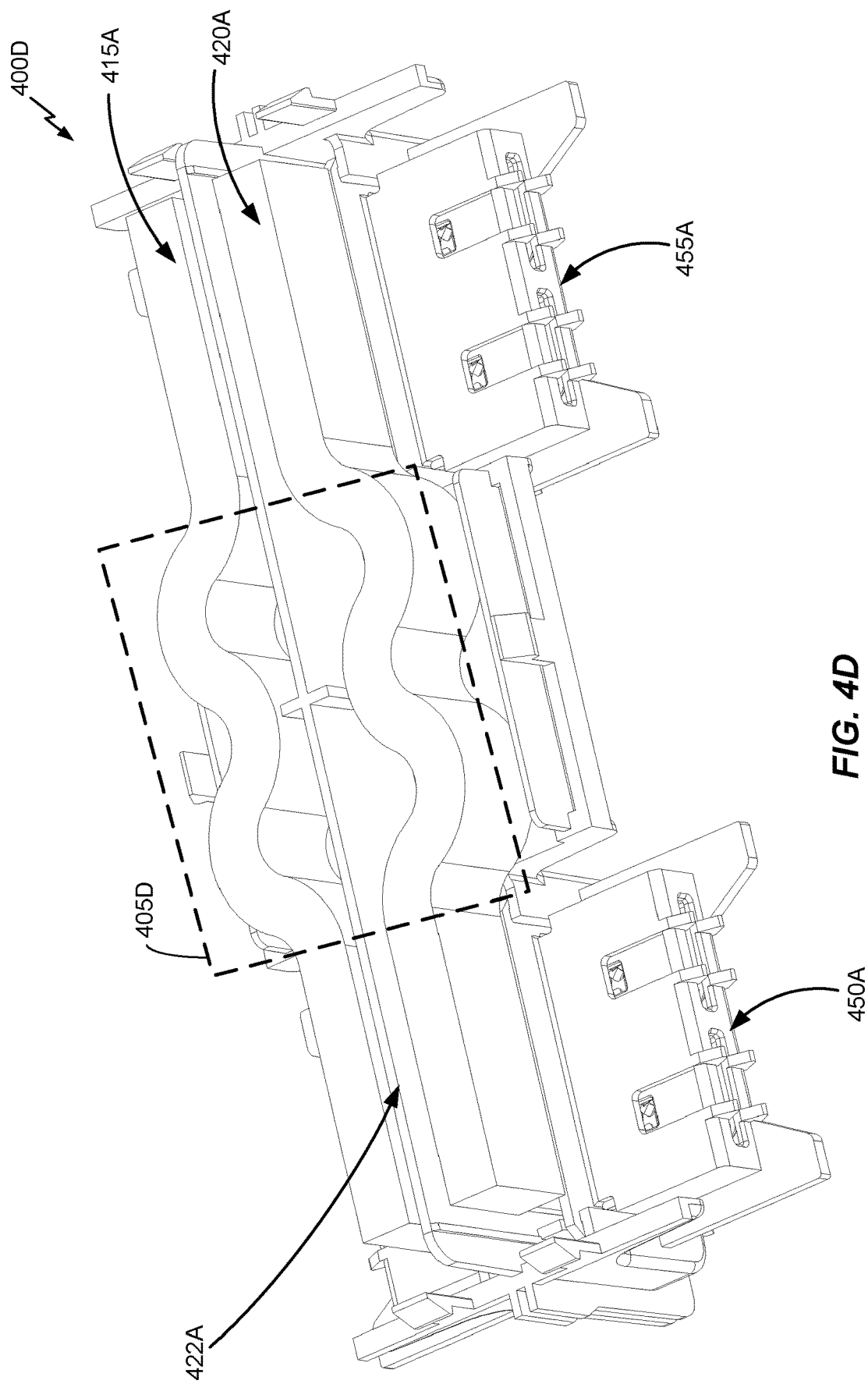

FIG. 4D illustrates interior sections 400D of the module-to-module power connector 400A in accordance with an embodiment of the disclosure. As shown in FIG. 4D, the busbars 415A-420A are not arranged as straight metallic bars. Instead, the busbars 415A-420A include flexible (e.g., curved or wavy) middle sections denoted in FIG. 4D with respect to 405D. For example, the curvature or waves in the flexible middle section 405D may be derived from the busbars 415A-420A being formed from laminated copper bands, woven copper, a flexible cable, or any combination thereof. The flexible middle sections 405D of the busbars 415A-420A are configured specifically to grant each respective busbar a given amount of flexibility which permits the associated electrical interfaces 425A-440A a defined range of movement during connection to corresponding electrical interfaces on respective battery modules. For example, the defined range of movement may be a 2 mm range of "X-direction" movement (e.g., left/right movement), a 2 mm range of "Z-direction" movement (e.g., up/down movement), or a combination thereof. Put another way, the defined range of movement may be 2 mm on a plane that is perpendicular to the insertion direction of the respective battery module (e.g., a plane comprising both X and Z directions). In a further example, the electrical interfaces 425A-440A may be configured to resist "Y-direction" movement (e.g., parallel to the insertion direction) based on support from the battery housing fitting 460A to accommodate a battery module's electrical interface to be plugged into a corresponding electrical interface on the module-to-module power connector during insertion of the battery module.

Figure 4E:
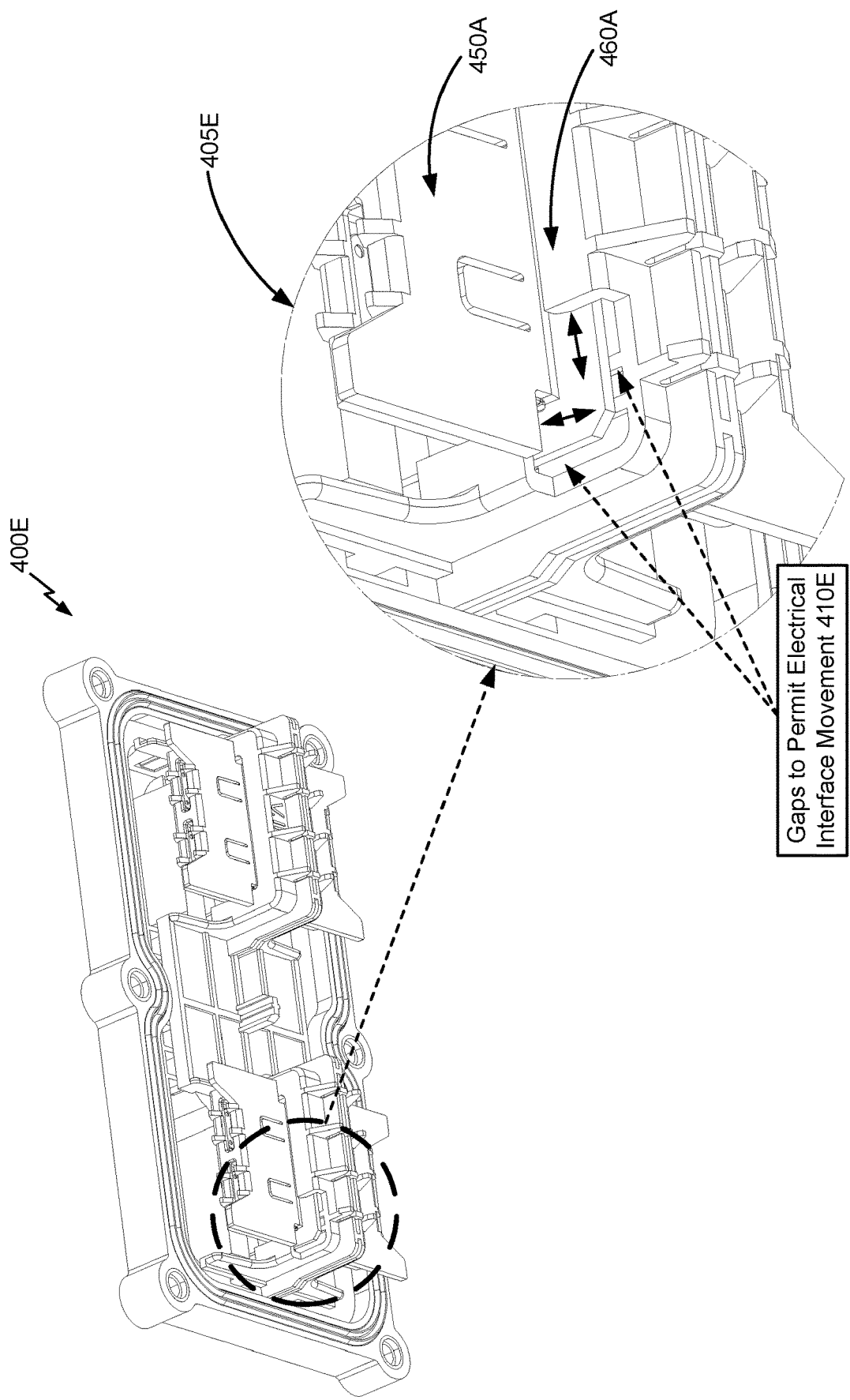

FIG. 4E illustrates an underside perspective 400E of the module-to-module power connector 400A in accordance with an embodiment of the disclosure. A zoomed-in perspective 405E of the underside perspective 400E is also shown in FIG. 4E, whereby gaps 410E are defined between the electrical interface cover 450A (and by implication, the electrical interface 435A as well) and the battery housing fitting 460A which permits the electrical interface 435A (and associated electrical interface cover 450A) to defined ranges of movement in both radial and Z directions. While not shown expressly in FIG. 4E, similar gaps may be defined with respect to each other electrical interface to permit similar defined ranges of movement.

Figure 4F:
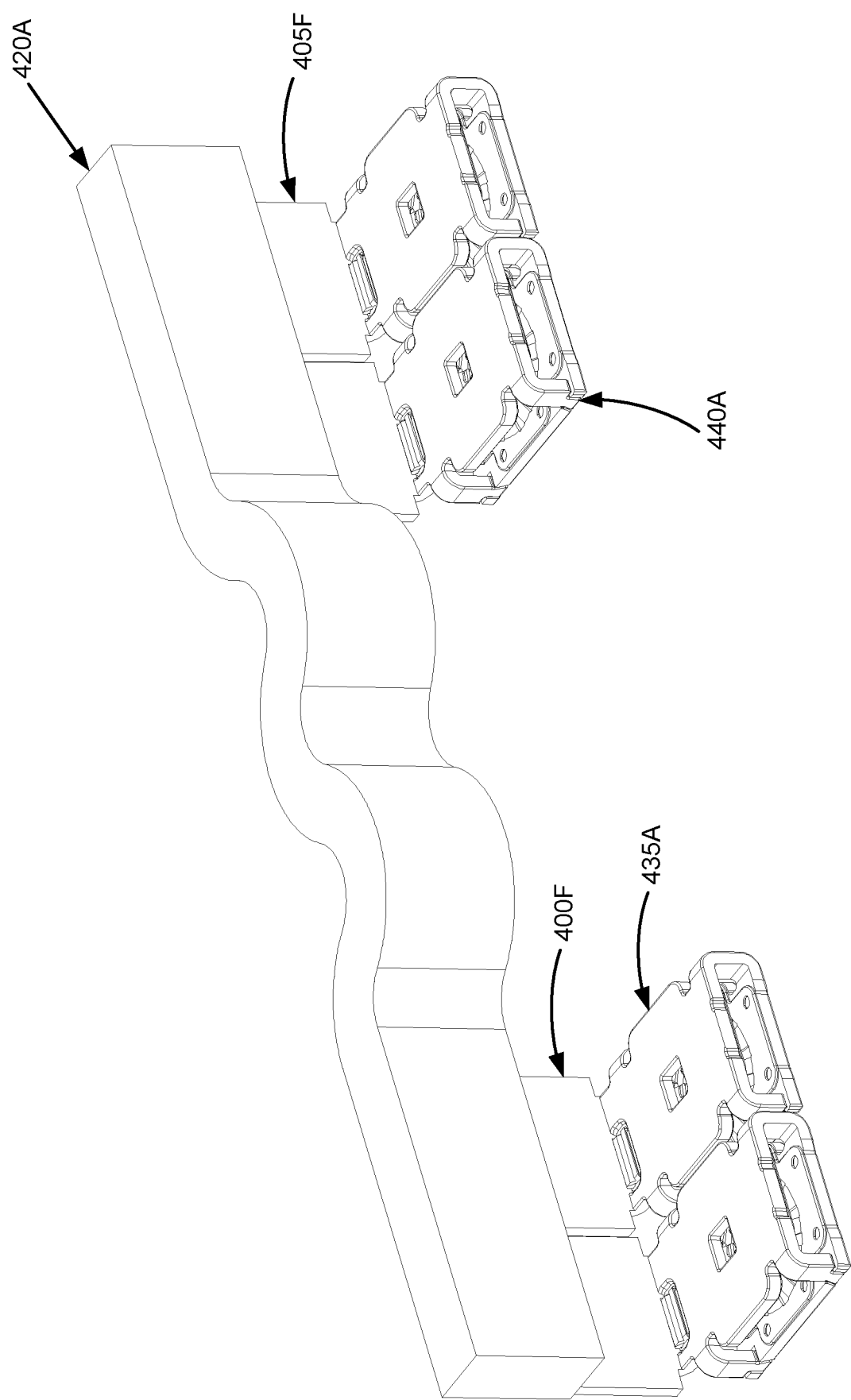

FIG. 4F illustrates the busbar 420A and associated electrical interfaces 435A and 440A in isolation in accordance with an embodiment of the disclosure. As shown in FIG. 4F, the busbar 420A is attached (e.g., via welding, etc.) to downward extending sections 400F and 405F of the electrical interfaces 435A and 440A, respectively. While not shown expressly, the busbar 415A may be configured similarly to the busbar 420A as depicted in FIG. 4F.

Figure 4G:
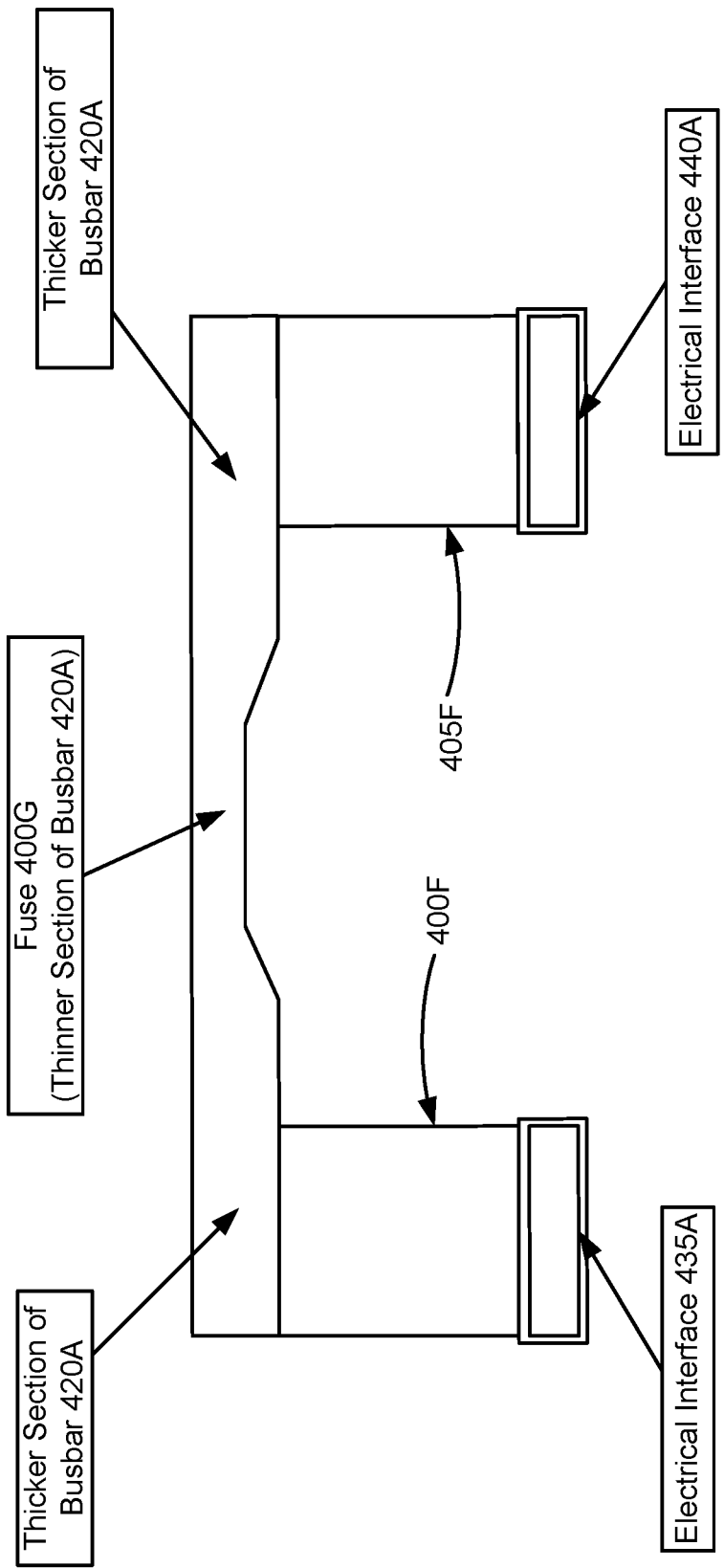

FIG. 4G a side perspective of the busbar 420A and associated electrical interfaces 435A in accordance with an embodiment of the disclosure. In FIG. 4G, a fuse 400G is integrated into the busbar 420A. For example, the fuse 400G may correspond to a thinner section of the busbar 420A which is surrounded by thicker sections of the busbar 420A. In a further example, the fuse 400G may be arranged at the flexible middle section 405D of the busbar 420A (and busbar 415A). As the current (or amperage) increases over the busbar 420A, the thinner section of the busbar 420A (or fuse 400G) will melt first, which may help to reduce or eliminate short circuits and/or fires from propagating through the battery housing 305A and/or tunnel space 315A. The fuse 400G is an example of a disconnect component that can be integrated into a module-to-module power connector to reduce or eliminate a voltage across electrical connections between battery modules. In particular, the fuse 400G is configured to melt (or blow) when an amperage flowing over the associated electrical connection (i.e., over a respective busbar) exceeds a fuse rating for the fuse 400G.

Figure 4H:
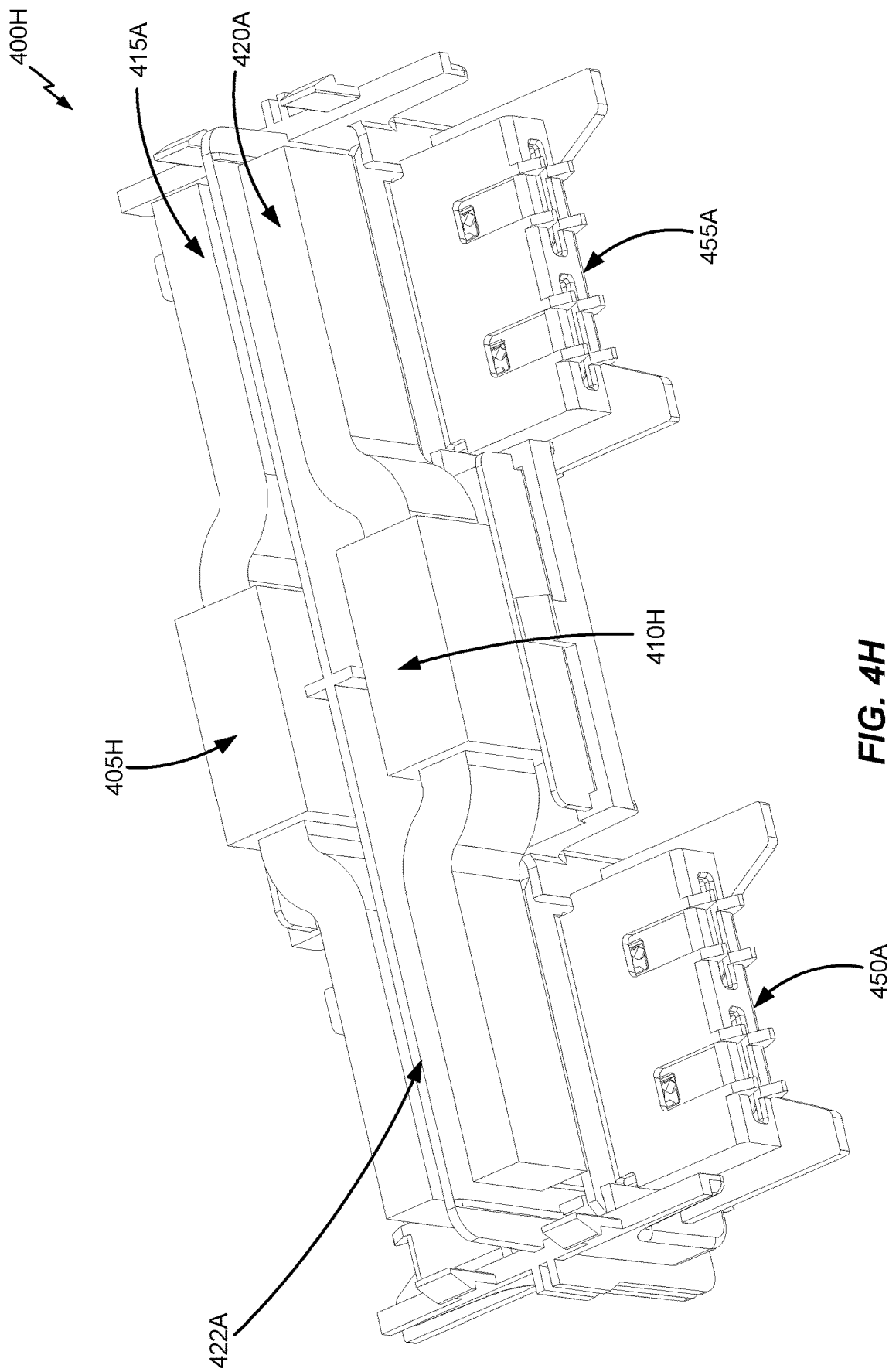

FIG. 4H illustrates interior sections 400H of the module-to-module power connector 400A in accordance with an embodiment of the disclosure. FIG. 4H is similar to FIG. 4D, except that protection sections 405H and 410H are arranged over the flexible middle section 405D. In an example, the protective sections 405H and 410H (e.g., quartz sand, etc.) may be arranged over respective integrated voltage disconnect components in the busbars 415A-420A, such as the fuse 400G depicted in FIG. 4G. In an example, the protective sections 405H and 410H may protect against arcs that can occur when a respective fuse melts.

Referring to FIG. 4H, in an alternative embodiment, the protection sections 405H and 410H may be arranged over an explosive component (e.g., a pyro fuse) instead of a fuse that merely melts in response to excessive heat and/or current. Explosive components are another example of disconnect components that can be integrated into a module-to-module power connector to reduce or eliminate a voltage across electrical connections between battery modules. In particular, the explosive components are configured to explode (e.g., so as to cause a rupture in a respective busbar so current cannot flow across the respective busbar) in response to heat and/or fire inside the module-to-module power connector 400A. The protective sections 405H and 410H in turn guard against the force of the explosion(s) so that only the respective busbar is impacted by the explosion. In a further example, the module-to-module power connector 400A may be communicatively coupled to a controller such as the BJB 300B. The controller may monitor various battery and/or other vehicle conditions on its own and make its own decision to cause a particular voltage disconnect component to explode. In this case, the trigger for the explosion of a particular explosive component may be a control signal from the controller, as opposed to heat and/or fire at the respective busbar.

Figure 4I:
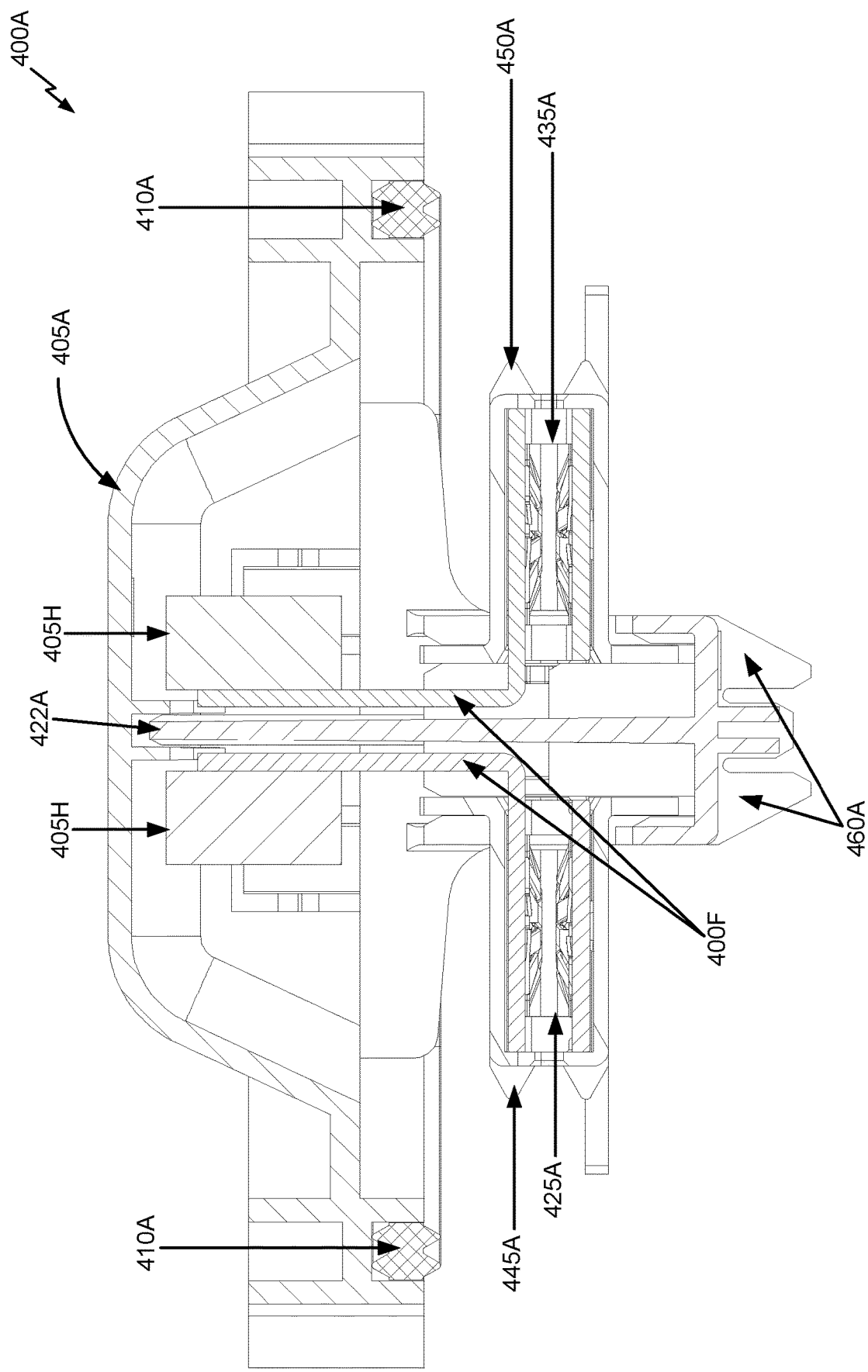
Figure 4J:
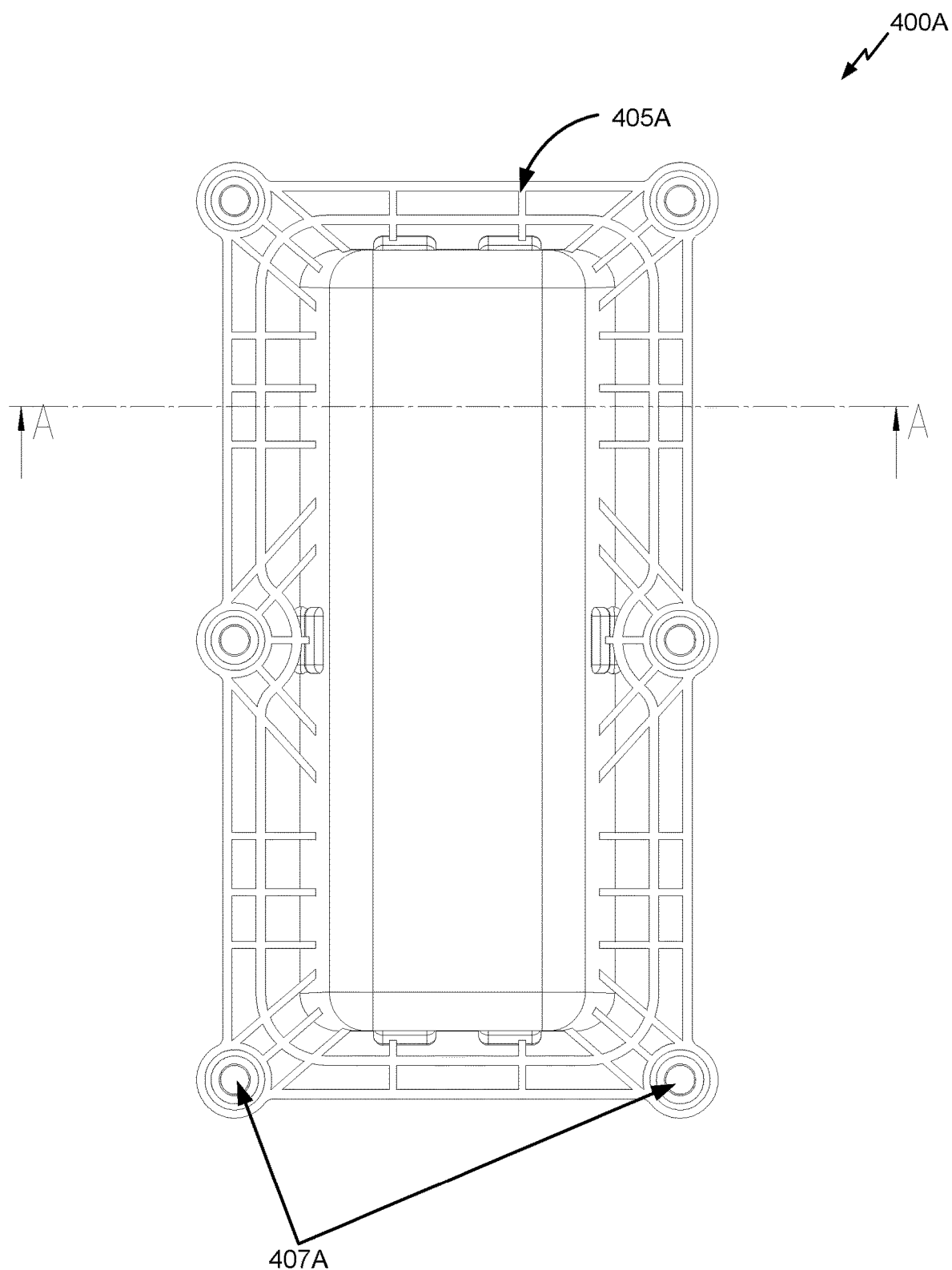

FIG. 4I illustrates another side perspective of the module-to-module power connector 400A in accordance with an embodiment of the disclosure. FIG. 4J illustrates a top perspective of the module-to-module power connector 400A in accordance with an embodiment of the disclosure.

Figure 5A:
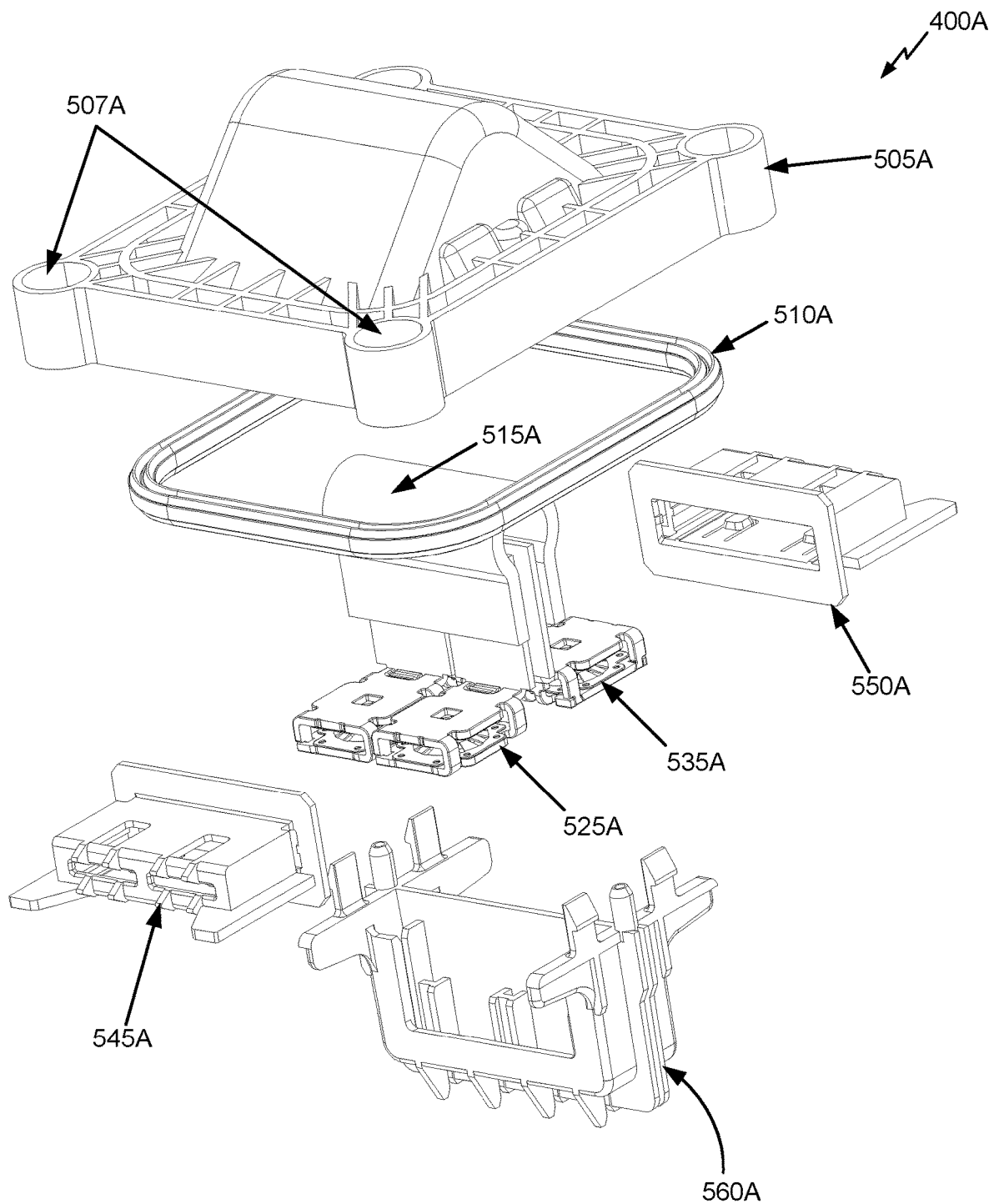

FIG. 5A illustrates an exploded perspective of a module-to-module power connector 500A in accordance with an embodiment of the disclosure. In an example, module-to-module power connector 500A may correspond to module-to-module power connectors 325B from FIG. 3B.

Referring to FIG. 5A, the module-to-module power connector 500A includes a top cover 505A (e.g., made from plastic and including a number of fixation points such as fixation points 507A for securing the module-to-module power connector 500A to the top of the battery housing 305A via bolts), a sealing component 510A (e.g., sealing compound, rubber, etc.), a busbar 515A (e.g., made from a conductive material such as copper), electrical interfaces 525A and 535A coupled to busbar 515A, electrical interface covers 545A-550A (e.g., made from plastic) configured to cover electrical interfaces 525A and 535A, respectively, and a battery housing fitting 560A (e.g., made from plastic). Electrical interfaces 525A and 535A are used to form an electrical connection between battery modules in laterally adjacent battery module compartments, such as battery module compartments A and F in FIG. 3B. As will be described below in more detail, the battery housing fitting 560A is configured for insertion into a hole in a top-side of the battery housing 305A inside of the tunnel space 315A.

FIG. 5B illustrates the module-to-module power connector 500A in accordance with another embodiment of the disclosure. Specifically, the perspective in FIG. 5B primarily depicts the top cover 505A, with portions of the electrical interface covers 545A and 550A also being visible.

Figure 5C:
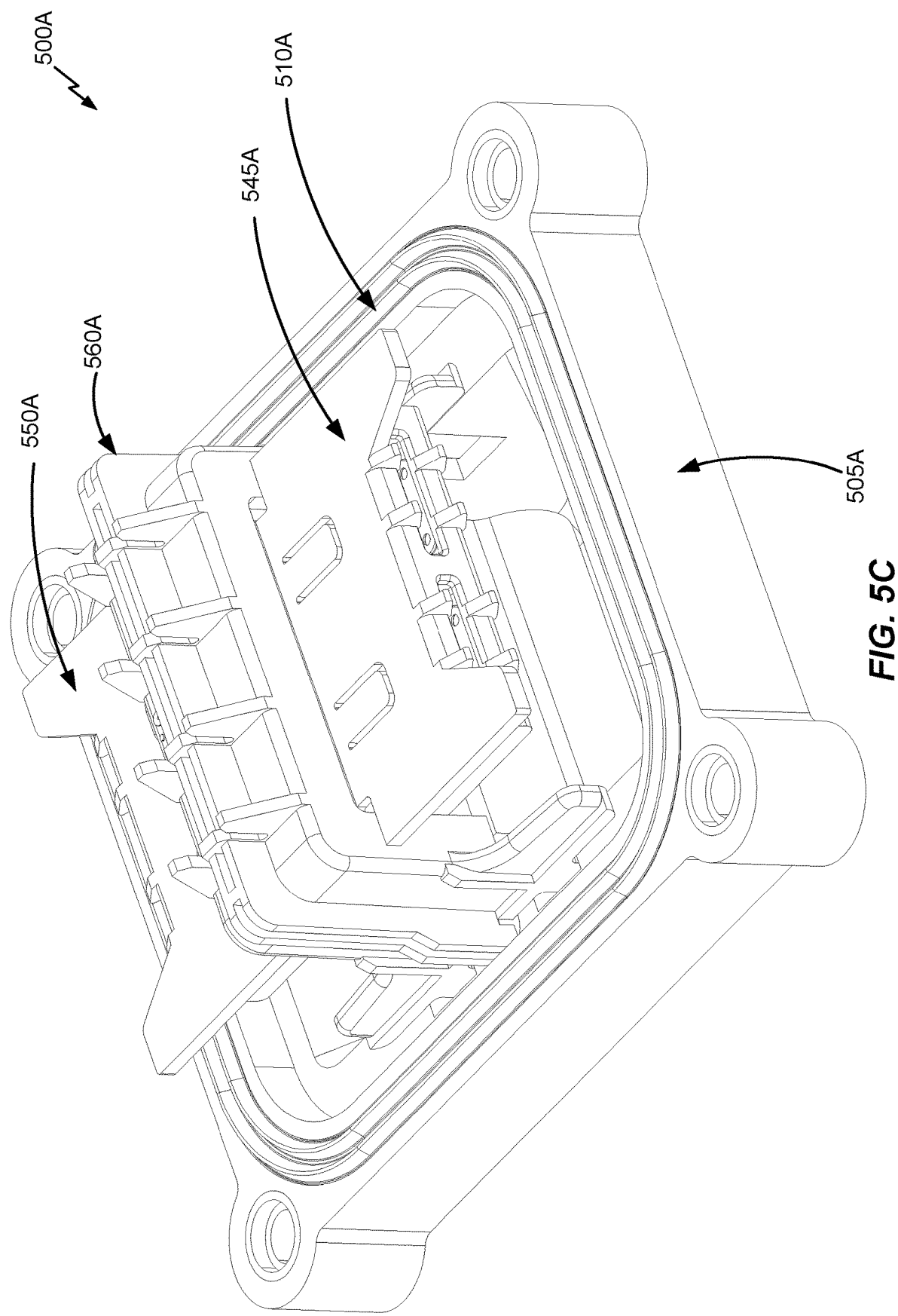

FIG. 5C illustrates the module-to-module power connector 500A in accordance with another embodiment of the disclosure. Specifically, the perspective in FIG. 5C more clearly shows the underside components of the module-to-module power connector 500A.

Referring to FIGS. 5A-5C, the busbar 515A and the battery housing fitting 560A are configured to extend downwards into the battery module mounting area for connecting to the respective battery modules. Accordingly, the electrical interfaces 525A and 535A and associated electrical interface covers 545A-550A are arranged inside of the battery housing 305A (e.g., beneath the tunnel space 315A). Alternatively, while various embodiments show the battery module mounting area beneath the tunnel space 315A, other embodiments need not have the tunnel space 315A arranged on top of the battery module mounting area. For example, the tunnel space 315A could instead be implemented in-between the laterally adjacent battery module compartments, in which case the electrical interfaces would extend laterally (instead of downwards) from the tunnel space into the battery module compartments. In yet another embodiment, the tunnel space could be arranged beneath the battery housing 305A with bottom-mounted module-to-module power connectors having electrical interfaces that extend into the battery housing 305A in an upwards direction from beneath the battery housing 305A. Accordingly, a tunnel space positioned on top of the battery housing 305A with downward-extending electrical interfaces from the module-to-module power connectors is not required in all embodiments.

Referring to FIGS. 5A-5C, when the module-to-module power connector 500A is mounted in the tunnel space 315A and secured (e.g., via screwing, bolting, etc.), the sealing component 510A is pressed down onto the battery housing 305A, which seals the module-to-module power connector 400A from an external environment (e.g., the rest of the tunnel space 315A, etc.). Further, each of the electrical interfaces 525A and 535A is configured to connect to either a positive or negative terminal of a corresponding battery module upon insertion of the battery module in accordance with the electrical diagram depicted in FIG. 3B with respect to module-to-module power connector 325B.

Figure 5D:
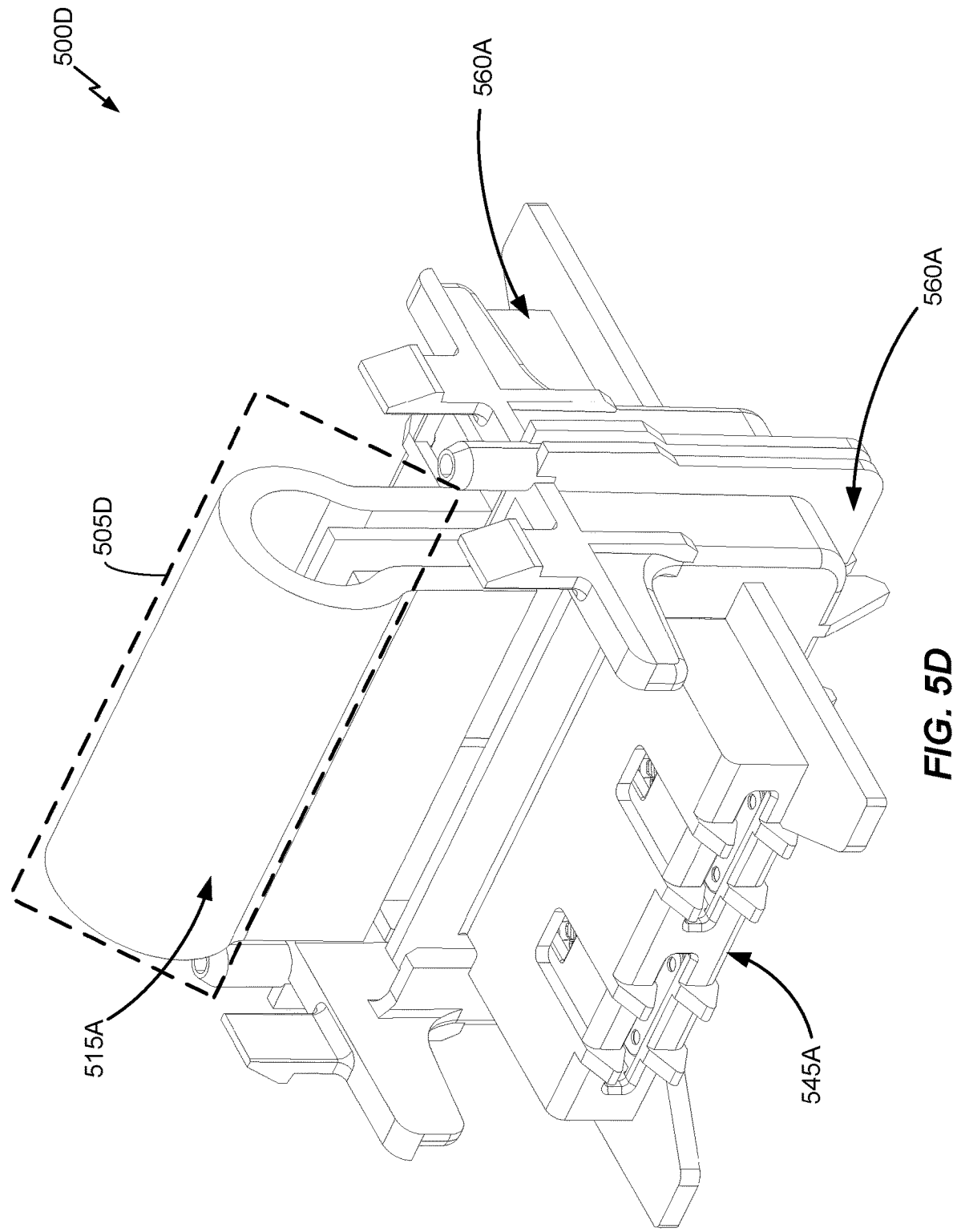

FIG. 5D illustrates interior sections 500D of the module-to-module power connector 500A in accordance with an embodiment of the disclosure. As shown in FIG. 5D, the busbar 515A is not arranged as a straight metallic bar. Instead, the busbar 515A include a flexible (e.g., curved) middle section denoted in FIG. 5D with respect to 505D. For example, the curvature or waves in the flexible middle section 505D may be derived from the busbar 515A being formed from laminated copper bands, woven copper, a flexible cable, or any combination thereof. The flexible middle section 505D of the busbar 515A is configured specifically to grant the busbar 515A a given amount of flexibility which permits the associated electrical interfaces 525A and 535A a defined range of movement during connection to corresponding electrical interfaces on respective battery modules. For example, the defined range of movement may be a 2 mm range of "X-direction" movement (e.g., left/right movement), a 2 mm range of "Z-direction" movement (e.g., up/down movement), or a combination thereof. Put another way, the defined range of movement may be 2 mm on a plane that is perpendicular to the insertion direction of the respective battery module (e.g., a plane comprising both X and Z directions). In a further example, the electrical interfaces 525A and 535A may be configured to resist "Y-direction" movement (e.g., parallel to the insertion direction) based on support from the battery housing fitting 560A to accommodate a battery module's electrical interface to be plugged into a corresponding electrical interface on the module-to-module power connector during insertion of the battery module. While not illustrated expressly, the defined ranges of movement may be similar to the defined ranges of movement described above with respect to the module-to-module power connector 400A in FIG. 5E.

Figure 5E:
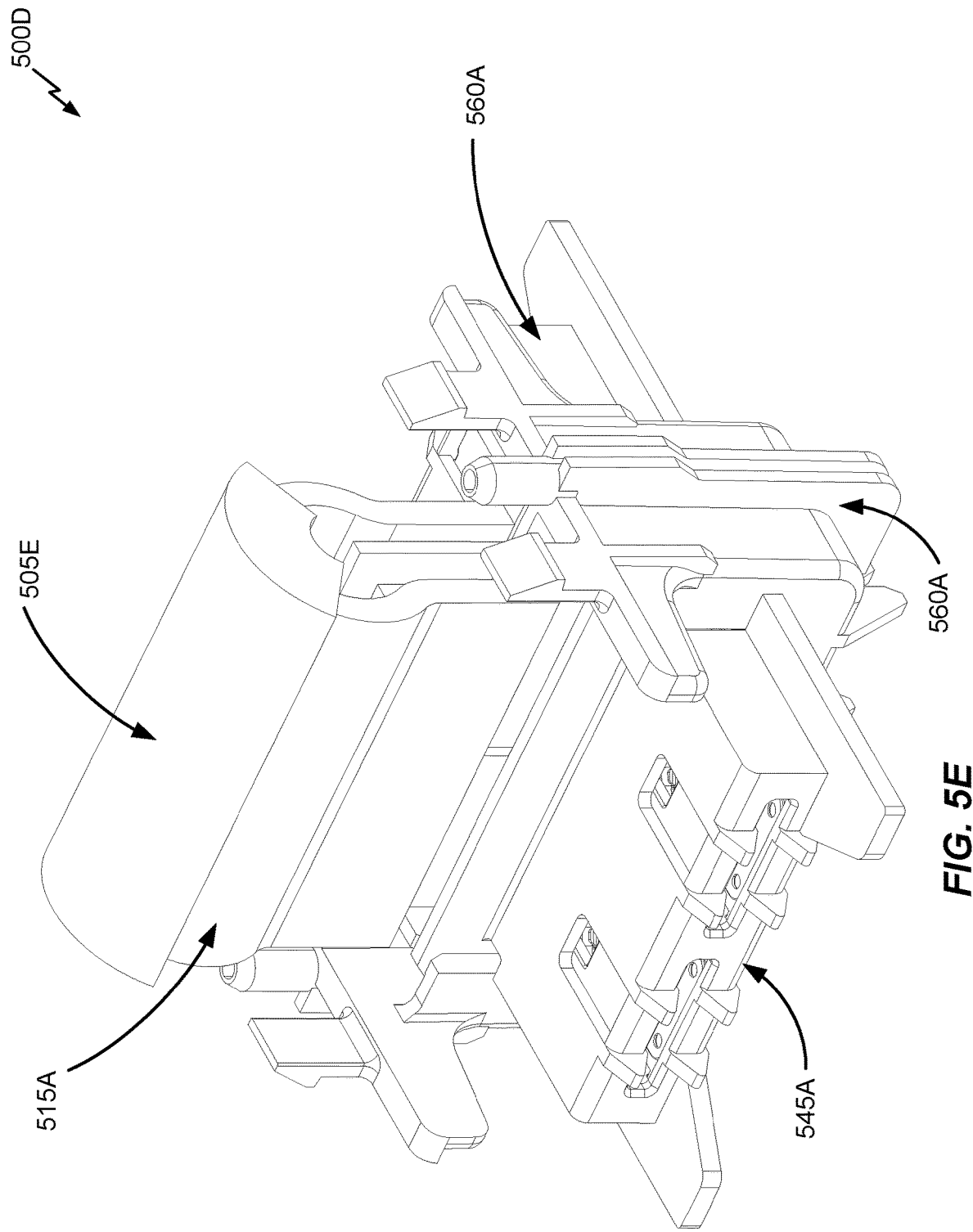

FIG. 5E illustrates interior sections 500E of the module-to-module power connector 500A in accordance with another embodiment of the disclosure. FIG. 5E is similar to FIG. 4E, except that protection section 505E is arranged over the flexible middle section 505D. In an example, the protective section 505E (e.g., quartz sand, etc.) may be arranged over a respective integrated voltage disconnect component in the busbar 515A, such as a fuse (e.g., similar to fuse 400G depicted in FIG. 4G, which may correspond to a thinner section of the busbar 515A). In an example, the protective section 505E may protect against arcs that can occur when a respective fuse melts.

Referring to FIG. 4E, in an alternative embodiment, the protection section 505E may be arranged over an explosive component (e.g., a pyro fuse) instead of a fuse that merely melts in response to excessive heat and/or current. Explosive components are another example of disconnect components that can be integrated into a module-to-module power connector to reduce or eliminate a voltage across electrical connections between battery modules. In particular, the explosive components are configured to explode (e.g., so as to cause a rupture in a respective busbar so current cannot flow across the respective busbar) in response to heat and/or fire inside the module-to-module power connector 500A. The protective section 505E in turn guards against the force of the explosion(s) so that only the respective busbar is impacted by the explosion. In a further example, the module-to-module power connector 500A may be communicatively coupled to a controller such as the BJB 300B. The controller may monitor various battery and/or other vehicle conditions on its own and make its own decision to cause a particular voltage disconnect component to explode. In this case, the trigger for the explosion of a particular explosive component may be a control signal from the controller, as opposed to heat and/or fire at the respective busbar.

Figure 5F:
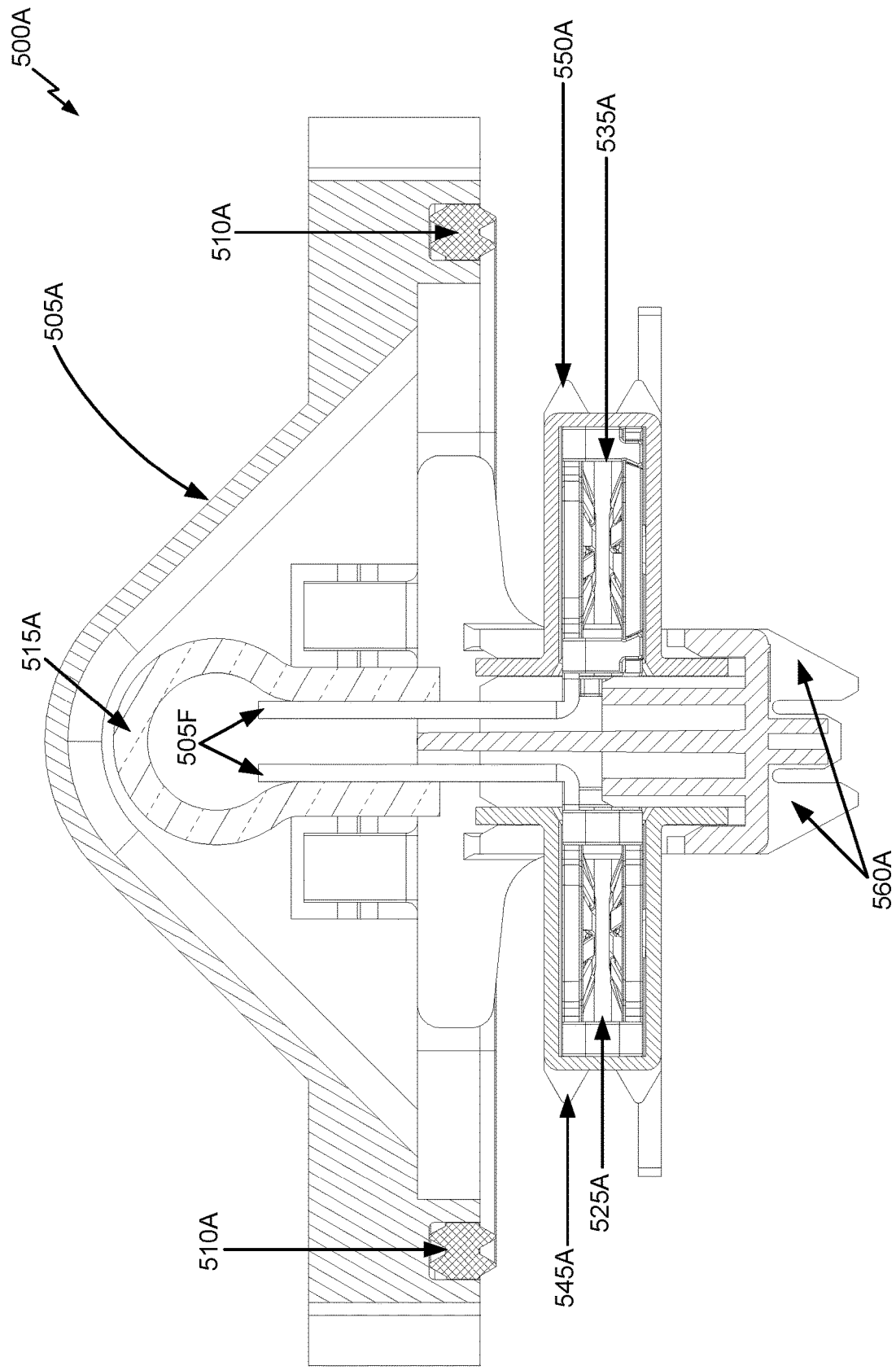
Figure 5G:
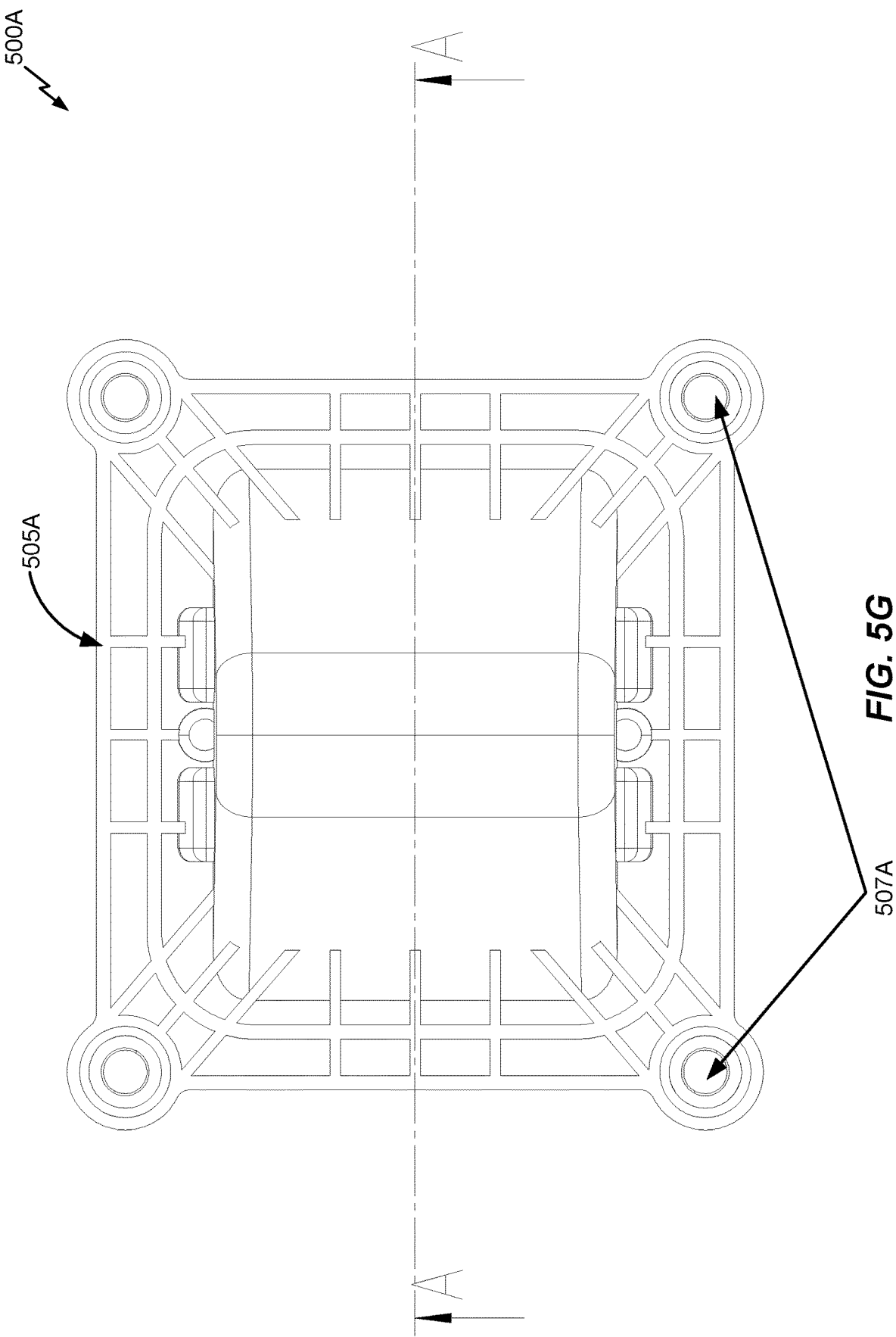

FIG. 5F illustrates another side perspective of the module-to-module power connector 500A in accordance with an embodiment of the disclosure. The perspective of FIG. 5F more clearly illustrates downward extending sections 500F of the busbar 515A, which are similar to the downward extending sections 400F and 405F in FIG. 4F and are coupled to the electrical interfaces 525A and 535A. FIG. 5G illustrates a top perspective of the module-to-module power connector 500A in accordance with an embodiment of the disclosure.

While the busbars 415A-420A run in a longitudinal direction in FIGS. 4A-4J (e.g., to chain together in series battery modules in longitudinally adjacent battery module compartments), the busbar 515A of FIGS. 5A-5G runs along a lateral direction (e.g., to chain together in series battery modules in laterally adjacent battery module compartments, such as battery module compartments A and F in FIG. 3B.).

While FIGS. 4A-5G describe implementations whereby each busbar includes an integrated voltage disconnect component (e.g., a fuse, an explosive component, etc.), in other embodiments, at least one and less than all of the busbars in the respective module-to-module power connectors may include the integrated voltage disconnect component (e.g., to save costs, etc.). As shown in the electrical diagram of FIG. 3B, even a single integrated voltage disconnect component may be sufficient to break the end-to-end power connection between the battery modules and the BJB 300B. Alternatively, for redundancy, a subset of the busbars or even all the busbars in each module-to-module power connector could include the integrated voltage disconnect component.

Examples will now be provided whereby the exemplary module-to-module power connectors described above are deployed with respect to an energy storage system for an electric vehicle in accordance with embodiments of the disclosure.

Figure 6A:
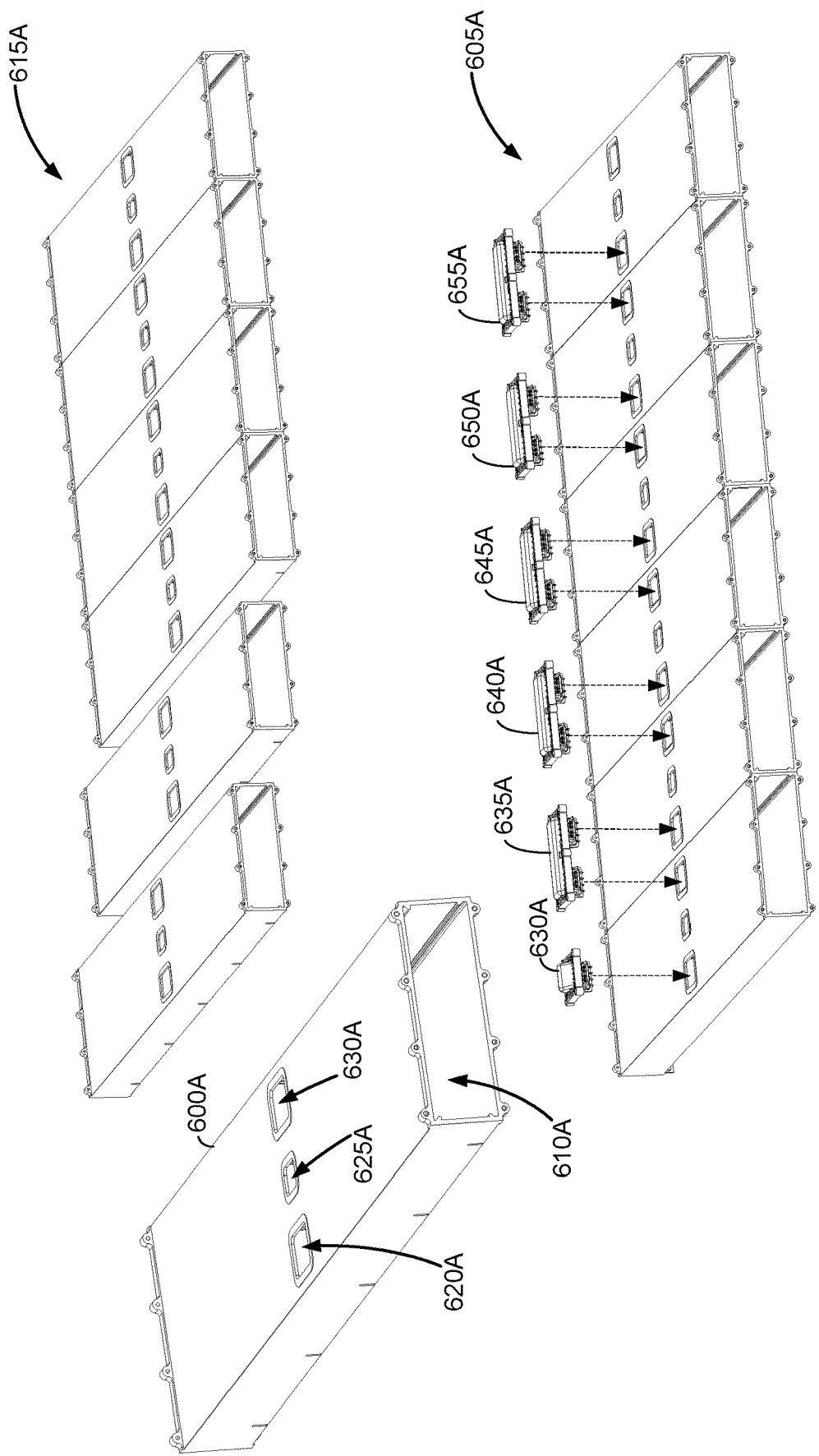
FIG. 6A illustrates example construction of a lateral-inserted battery module mounting area configuration in accordance with an embodiment of the disclosure.

FIG. 6A illustrates example construction of a lateral-inserted battery module mounting area configuration in accordance with an embodiment of the disclosure. In FIG. 6A, the battery module mounting area 605A is shown as being constructed from a series of battery module compartment chambers 600A. Each battery module compartment chamber 600A is configured with a battery module compartment on each side as a paired battery module compartment arrangement, with each battery module compartment configured to receive a respective battery module. The battery module compartment chamber 600A includes a plurality of exterior walls that define an exterior frame of the battery module compartment chamber 600A, and at least one interior wall (not shown in FIG. 6A) that acts as a firewall between the respective battery module compartments of the battery module compartment chamber 600A and separates (and forms a seal with respect to) the respective battery module compartments. In particular, the at least one interior wall (or firewall) may help to fix the respective battery modules into a desired position upon insertion, to protect each respective battery module compartments from hazards in the other battery module compartment, guide crash forces, support module-to-module power connectors and connectors for LV interfaces and/or reduce a risk that the battery housing itself will collapse. In an example, the battery module compartment chamber 600A may include at least one interior wall to seal the respective battery module compartments an external environment while defining a tunnel space located above the battery housing). Further, in an example, each interior wall of the battery module compartment chamber 600A may be comprised of a single sheet of sheet metal or multiple sheets of sheet metal that are pressed or 'sandwiched' together.

Referring to FIG. 6A, an insertion-side (or opening) 610A is shown on one particular exterior-facing side of the battery module compartment chamber 600A. While not shown explicitly in FIG. 6A, an identical insertion-side may be arranged on the opposing exterior-facing side of the battery module compartment chamber 600A. The respective insertion-sides are each configured to permit respective battery modules to be inserted into the respective interior spaces of the respective battery module compartments which are part of the battery module compartment chamber 600A. In an example, each respective insertion-side of the battery module compartment chamber 600A is configured to be closed via respective lateral insertion-side covers so that each battery module compartment in the battery module compartment chamber 600A is sealed from the other battery module compartment. Because each battery module compartment chamber 600A may be stacked longitudinally with respect to the electric vehicle as shown at 615A, the two battery module compartments in each particular battery module compartment chamber 600A are considered to be laterally paired or laterally adjacent (e.g., left-side and right-side paired battery module compartments at the same longitudinal location along the battery module mounting area).

In FIG. 6A, the battery module compartment chamber 600A includes holes 620A, 625A and 630A which open into the tunnel space. In an example, the middle hole (i.e., hole 625A) may be configured to support an LV communications interface (e.g., an optical communications interface) into the tunnel 315A, while the holes 620A-625A are used to support HV power interconnections between modules or with the BJB 300B. In particular, module-to-module power connectors 630A-655A are shown aligned with respective holes into which their respective electrical interfaces may be inserted into, and sealed over, the respective holes across the battery module mounting area 605A. Accordingly, when the battery modules are fully inserted into the respective battery module compartments of the battery module compartment chamber 600A, the battery module compartments are sealed off from an outside environment (e.g., via walls, covers, and O-rings), while still being connected to both the HV busbars and LV communications interface. The sealing of the battery module compartments helps to protect against hazards (e.g., water, excessive heat or fire, gas, etc.) in an external environment from spreading or propagating through the battery housing.

Figure 6B:
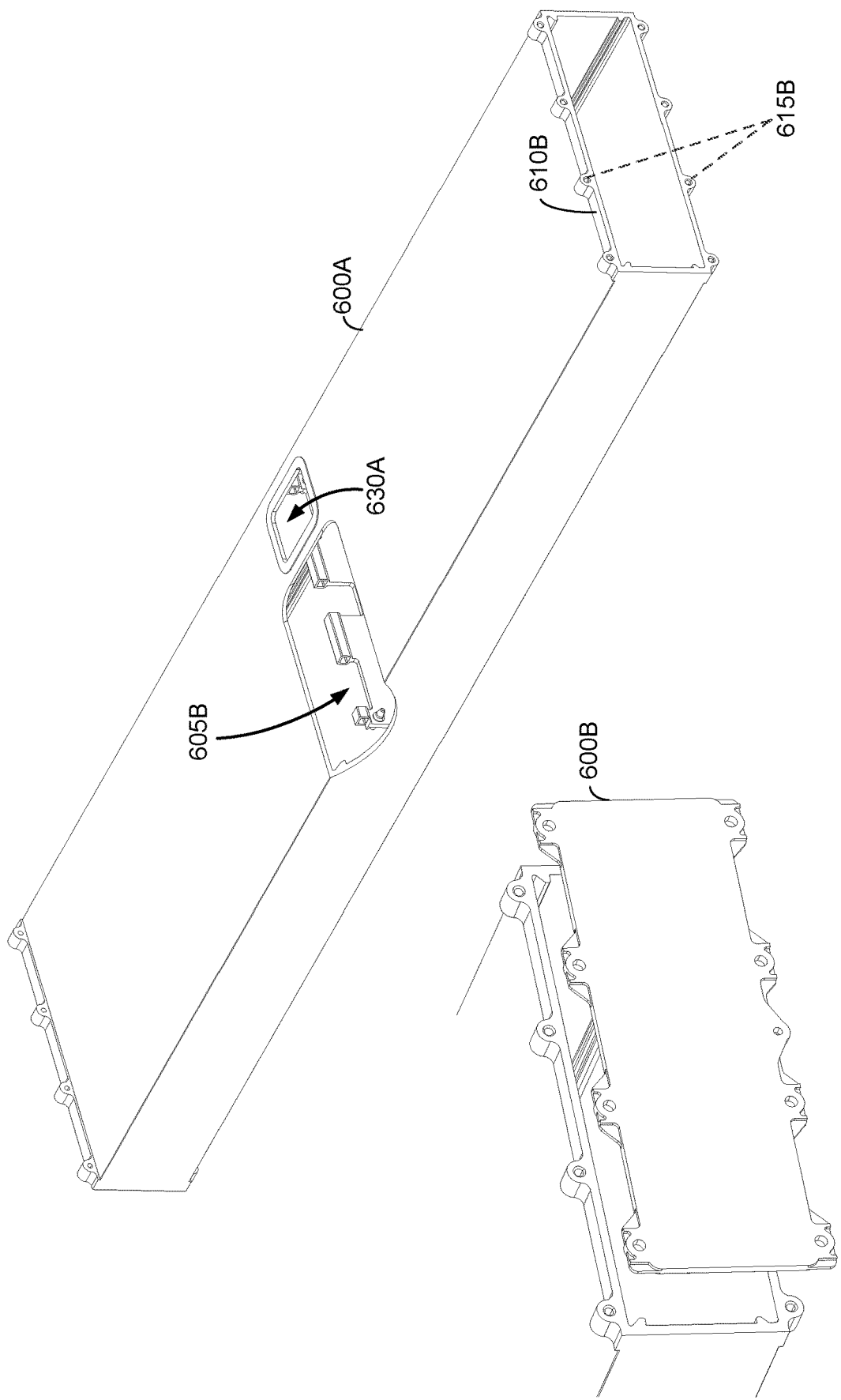
FIG. 6B illustrates an example of a battery module compartment in accordance with an embodiment of the disclosure.

FIG. 6B illustrates an example of the battery module compartment chamber 600A of FIG. 6A in more detail in accordance with an embodiment of the disclosure. In FIG. 6B, the lateral opening at each battery module compartment of the battery module compartment chamber 600A may be sealed via a cover 600B. In alternative embodiments, a cover configured to seal multiple battery module compartments across different adjacent battery module compartment chambers 600A may be used, as discussed above. While the cover 600B in FIG. 6B is shown as an independent component, the cover 600B may alternatively be integrated with a respective battery module prior to installation into a battery module compartment of the battery module compartment chamber 600A.

Referring to FIG. 6B, an interior firewall 605B that seals a respective battery module compartment of the battery module compartment chamber 600A, and also forms part of the middle bar 310A, is shown by omitting a portion of the top-side of the battery module compartment chamber 600A from view. A flange 610B and a set of integrated fixation points 615B for securing the cover 600B to the battery module compartment chamber 600A, and sealing the respective battery module compartment, are also shown in FIG. 6B. The cambers of battery module compartment chamber 600A are divided by the interior walls 605B. As discussed above, the flange 610B is an optional feature, as alternative embodiments may use a clamp or clip-type mechanism to attach the cover 600B to the battery module compartment.

Figure 6C:
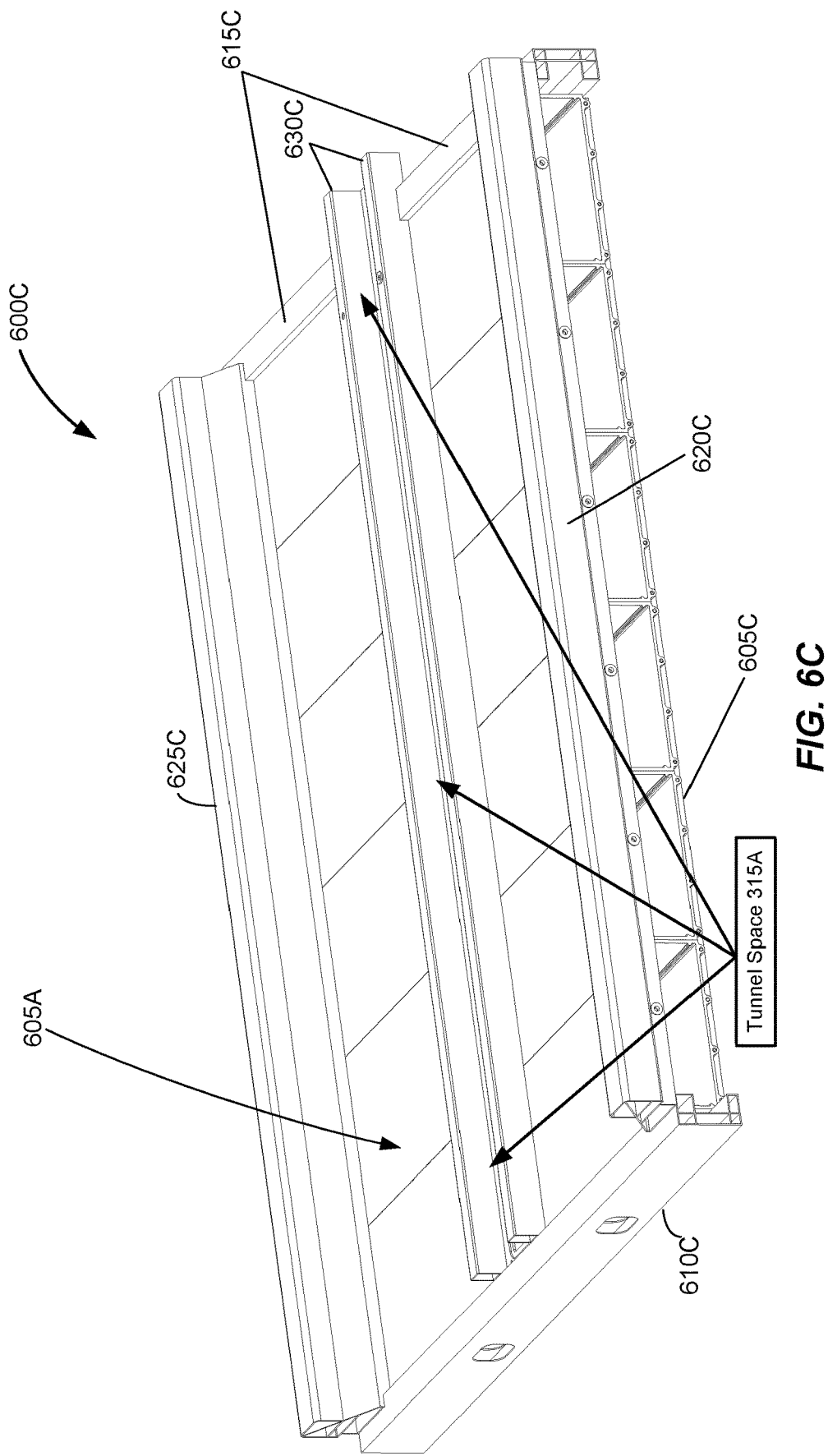
FIG. 6C illustrates a battery housing reinforcement configuration in accordance with an embodiment of the disclosure.

FIG. 6C illustrates a battery housing reinforcement configuration 600C in accordance with an embodiment of the disclosure. Referring to FIG. 6C, once the battery module mounting area 605A is constructed, the battery module mounting area 605A may be reinforced with a bottom-mounted bar 605C (e.g., underneath the flange), a front-mounted bar 610C, a back-mounted bar 615C, side-mounted bars 620C-625C and a set of center-mounted bars 630C. In an example, the set of center-mounted bars 615C may be used to define a gap that is used as the tunnel space 315A above the battery module mounting area 605A. While not shown expressly in FIG. 6C, the tunnel space 315A may be formed when the above-noted gap is closed or sealed via a top-cover (e.g., formed from sheet metal), as well as being sealed at respective longitudinal ends of the tunnel space 315A.

FIG. 6D illustrates a perspective of the tunnel space 315A that is defined by the battery housing reinforcement configuration 600C of FIG. 6C and includes the module-to-module power connector 500A of FIG. 5A (e.g., corresponding to 630A from FIG. 6A) in accordance with an embodiment of the disclosure. In FIG. 6D, a top cover for the tunnel space 315A is labeled as 600D.

Figure 6E:
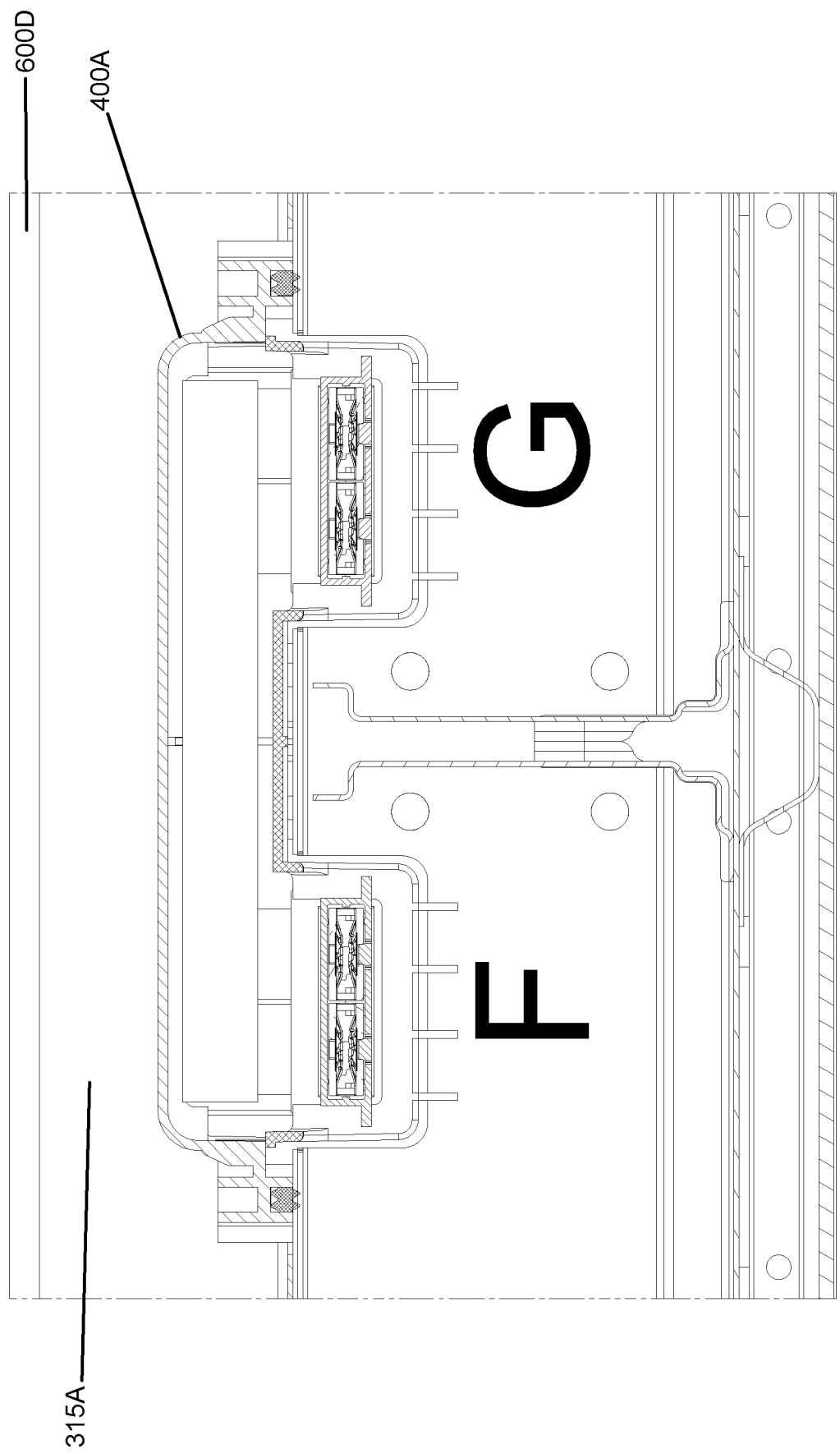
FIG. 6E illustrates a perspective of a battery housing that includes the module-to-module power connector of FIG. 4A in accordance with an embodiment of the disclosure.

FIG. 6E illustrates a perspective of the battery housing 305A that includes the module-to-module power connector 400A of FIG. 4A (e.g., corresponding to 635A from FIG. 6A, between battery module compartments F and G as depicted in FIG. 3A) in accordance with an embodiment of the disclosure.

Figure 6F:
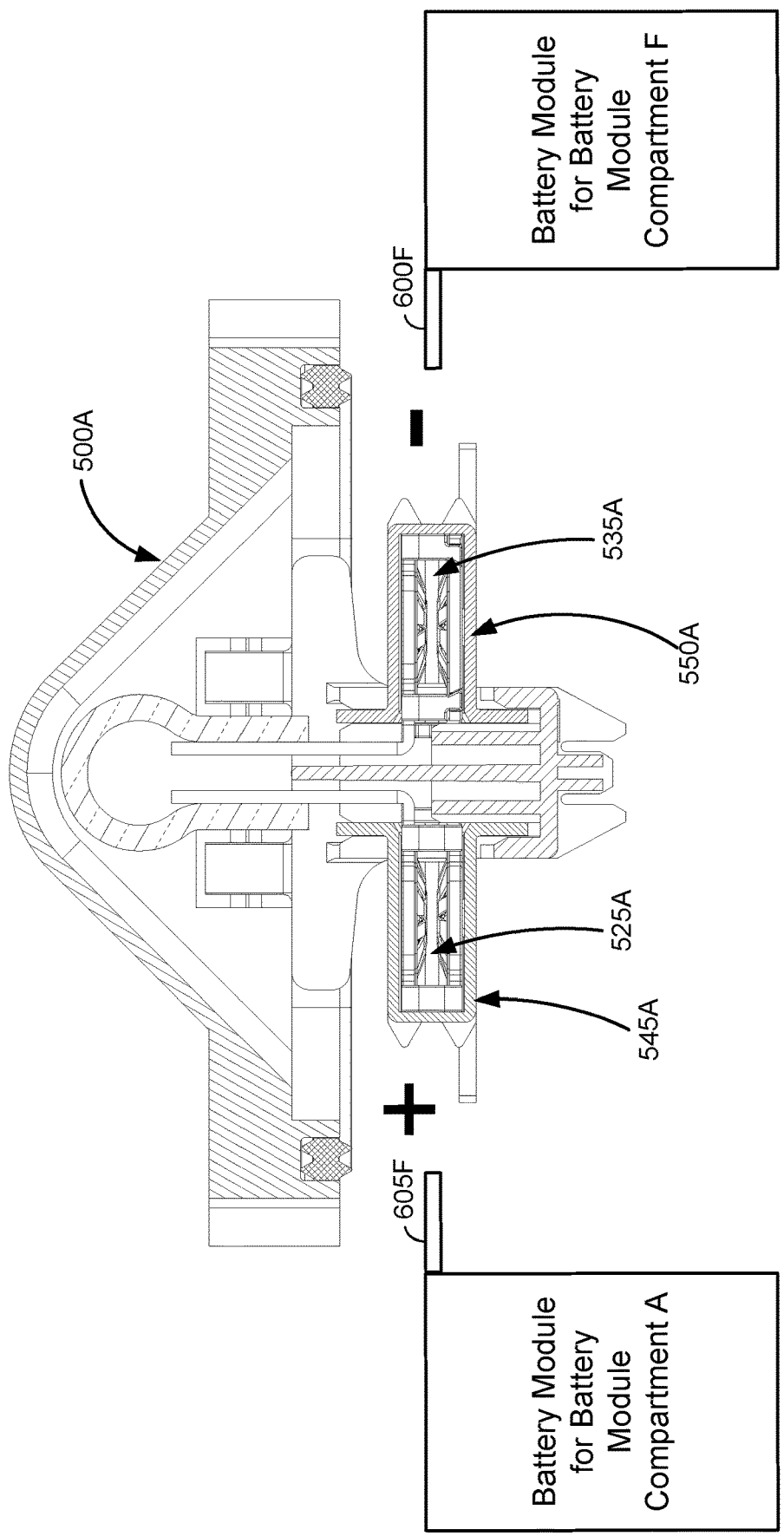
FIG. 6F illustrates a module-to-module power connector installed between battery module compartments in accordance with an embodiment of the disclosure.

FIG. 6F illustrates an example implementation of FIGS. 3C and 6A whereby the module-to-module power connector 500A (or 630A in FIG. 6A) is installed between battery module compartments A and F (e.g., in hole 620A of a battery module mounting compartment chamber of the battery module mounting area 605A) in accordance with an embodiment of the disclosure. In FIG. 6F, the electrical interfaces on the respective battery modules being inserted into battery module compartments A and F are labeled as 605F and 600F, respectively. As shown in FIG. 6F, the respective battery modules may slide into their respective battery module compartments in a lateral direction, with the electrical interfaces 600F-605F being aligned with corresponding electrical interfaces 525A and 535A, respectively, on the module-to-module power connector 500A. In an example, the defined range of movement (or motion) in the X and Z directions based on the flexible configuration of the busbar 515A as described above with respect to FIGS. 5A-5G may be used to facilitate the electrical interface inter-connections during insertion of the battery modules into the respective battery module compartments. So, the respective electrical interfaces do not need to be perfectly aligned, so long as the electrical interfaces upon insertion are within the defined range of movement (or motion). While not shown expressly, the flexible middle section of busbars 415A-420A may similarly facilitate electrical interface inter-connections between the module-to-module power connector 500A and respective battery modules as well.

Figure 7A:
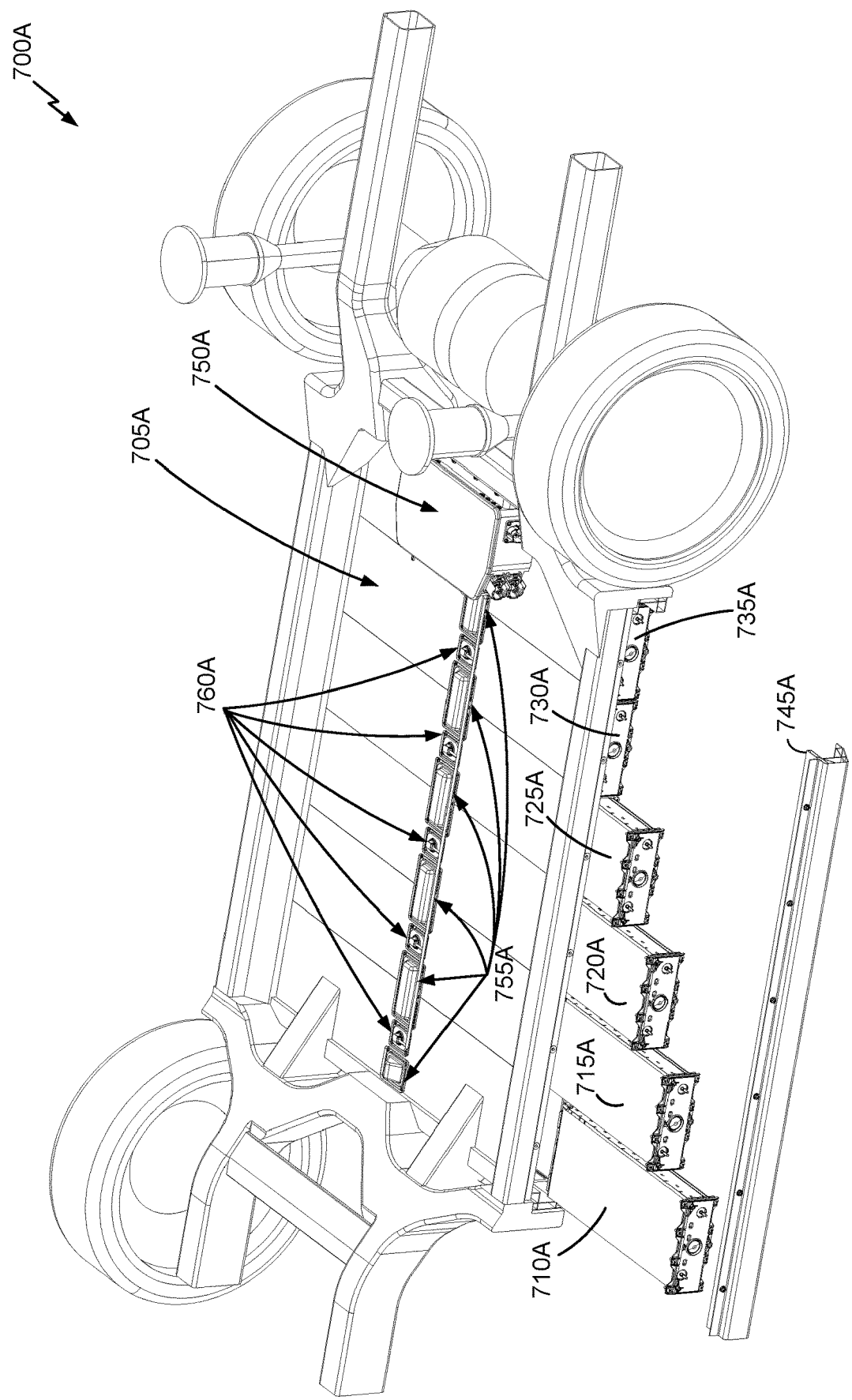
FIGS. 7A-7B illustrate examples whereby module-to-module power connectors are arranged between battery modules of an electric vehicle in accordance with embodiments of the disclosure.
Figure 7B:
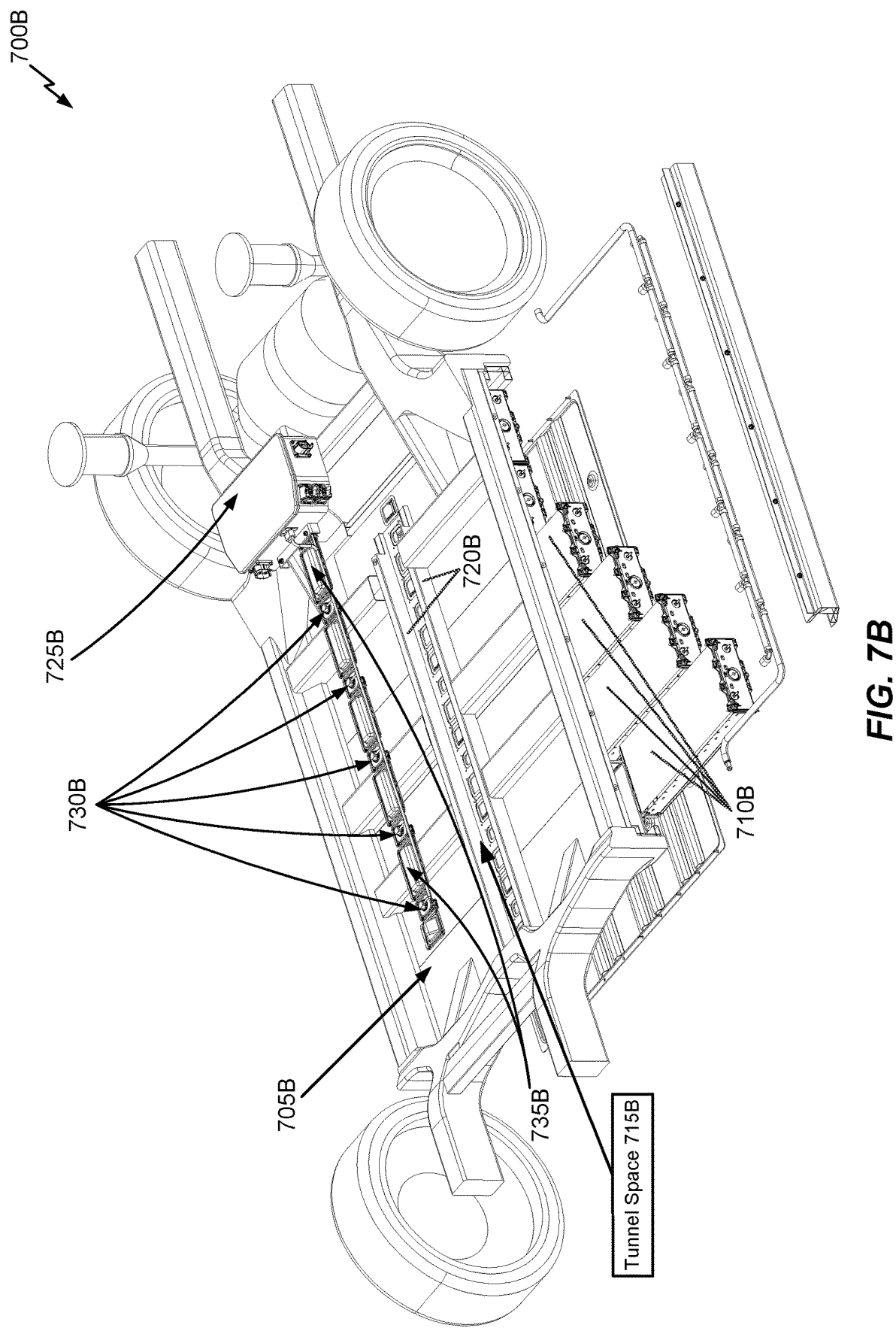

FIGS. 7A-7B illustrate examples whereby module-to-module power connectors are arranged between battery modules of an electric vehicle in accordance with embodiments of the disclosure. In particular, FIGS. 7A-7B illustrate examples specific to a lateral-inserted battery module mounting area configuration for a battery housing of an electric vehicle.

Referring to FIG. 7A, an electric vehicle 700A includes a battery module mounting area 705A that includes, on a left side of the electric vehicle 700A, battery module compartments configured to receive battery modules 710A-735A via left-side lateral insertion. In FIG. 7A, battery modules 710A-725A are shown at different degrees of lateral insertion, while battery modules 730A-735A are shown in a fully-inserted state. While not shown explicitly in FIG. 7A, the battery module mounting area 705A may further include, on a right side of the electric vehicle 700A, battery module compartments configured to receive other battery modules 710A-735A via right-side lateral (or side) insertion. More specifically, the insertion-sides of the battery modules 710A-735A correspond to the left exterior-facing lateral side of each respective battery module compartment on the left side (longitudinally) of the electric vehicle 700A, and the insertion-sides of the battery modules of each respective battery module compartment on the right side (longitudinally) correspond to the right exterior-facing lateral side of the electric vehicle 700A. Rocker panel 745A may be attached to the electric vehicle 700A.

Referring to FIG. 7A, a BJB 750A is mounted on top of the battery module mounting area 705A, and is electrically connected to the battery modules 710A-735A (and also the right-side battery modules, which are not shown explicitly in FIG. 7A) via module-to-module power connectors 755A. Further, a battery module controller (not shown) coupled to the BJB 750A is communicatively coupled to each battery module via LV busbars 760A, although in other embodiments an optical communications interface (e.g., a light tube, etc.) may be used. While not shown expressly in FIG. 7A, the module-to-module power connectors 755A and LV busbars 760A may each be deployed in a protected tunnel space, as described above.

Referring to FIG. 7B, another electric vehicle 700B is depicted with a battery module mounting area 705B. The battery module mounting area 705B is configured similarly to the battery module mounting area 705A in FIGS. 6A-6C. Various battery modules 710B are shown at various degrees of insertion into the battery module mounting area 705B. A tunnel space 715B is defined above the battery module mounting area 705B by a set of center-mounted bars 720B, which correspond to the set of center-mounted bars 630C in FIG. 6C. Further shown in FIG. 7B is a BJB 725B that is configured to be connected to the various battery modules via both LV busbars 730B and module-to-module power connectors 735B. While not shown expressly in FIG. 7B, the LV busbars 730B and module-to-module power connectors 735B may be installed inside of the tunnel space 515B, and then sealed (e.g., via bolting or screwing onto the top of the battery module mounting area 705B). Also, while the BJB 725B, the LV busbars 730B and the module-to-module power connectors 735B are shown as floating above the battery housing components in FIG. 7B, it will be appreciated that this is for convenience of illustration as the BJB 725B is installed adjacent to the tunnel space 715B and the LV busbars 730B and the module-to-module power connectors 735B are installed inside the tunnel space 715B.

While the module-to-module power connectors in the embodiments describe above are used to form serial connections between battery modules in respective battery module compartments to ramp up the voltage level being supplied to the BJB 300B, in alternative embodiments, some or all of the module-to-module power connectors may instead be configured to form parallel connections between the battery modules in respective battery module compartments to increase current instead. Accordingly, the specific type of connection formed by the module-to-module power connectors may vary by implementation depending on whether higher current or higher voltage is desired.

Figure 8A:
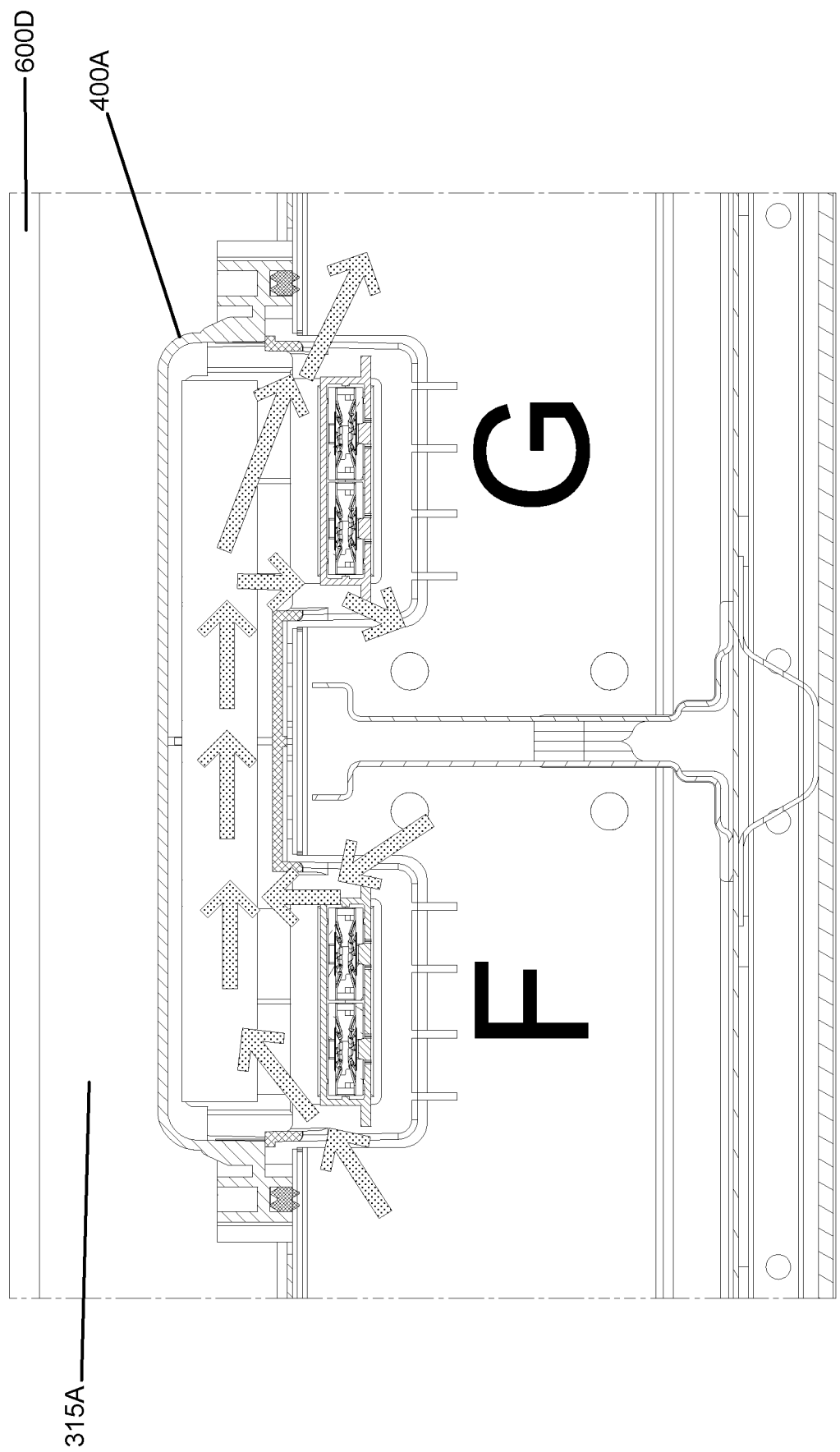
FIG. 8A illustrates a perspective of the tunnel space that is defined by the battery housing reinforcement configuration of FIG. 6C with arrows that depict an inside-to-outside airflow when external environment pressure is lower than a pressure inside of the battery housing in accordance with an embodiment of the disclosure.
Figure 8B:
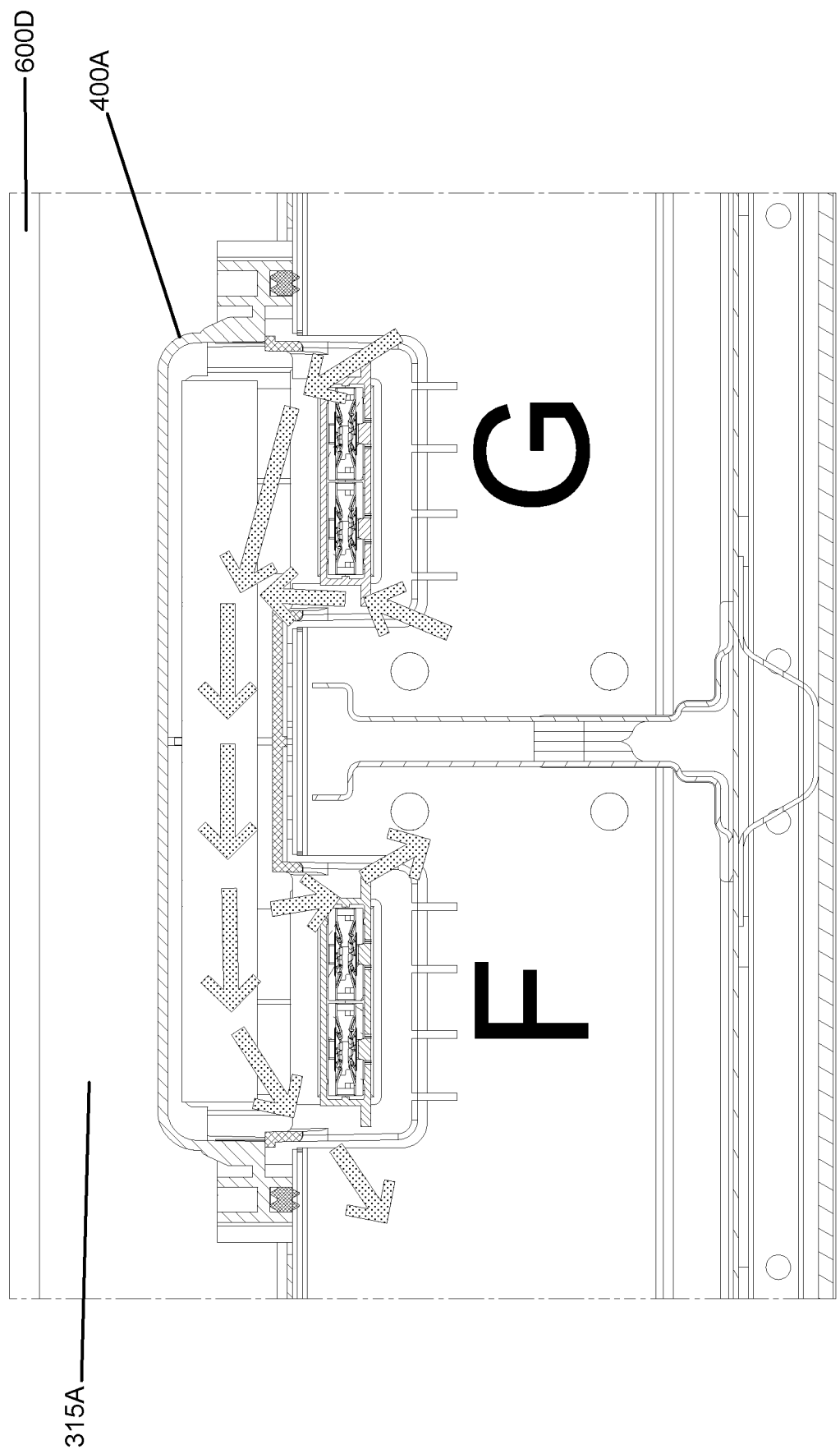
FIG. 8B illustrates a perspective of the tunnel space that is defined by the battery housing reinforcement configuration of FIG. 6C with arrows that depict an outside-to-inside airflow when external environment pressure is higher than a pressure inside of the battery housing in accordance with an embodiment of the disclosure.

In a further embodiment, the battery module compartments inside of the battery module mounting area may be vented to an outside environment via the tunnel space 315A and the BJB 300B. In an example, each module-to-module power connector may be configured with gaps that permit airflow between adjacent battery module compartments. As shown in FIGS. 8A-8B, the perspective of described above with respect to FIG. 6D is shown. In FIGS. 8A-8B, further shown are arrows that depict air movement through the module-to-module power connector 400A. As used herein, reference to air movement or "airflow" refers to a movement of air that occurs based on a pressure differential (e.g., pressure compensation from air expansion), as opposed to airflow that occurs based on physical forces such as an electric fan, wind, etc. In this context, a "direction" of airflow is from the higher pressure area towards the lower pressure area. In particular, FIG. 8A depicts an inside-to-outside airflow, which occurs when external environment pressure is lower than a pressure inside of the battery module compartments, whereas FIG. 8B depicts an outside-to-inside airflow, which occurs when external environment pressure is higher than the pressure inside of the battery module compartments. As used herein, reference to "pressure" of the external environment 900 or inside of the battery module compartments relates to barometric pressure.

Figure 9A:
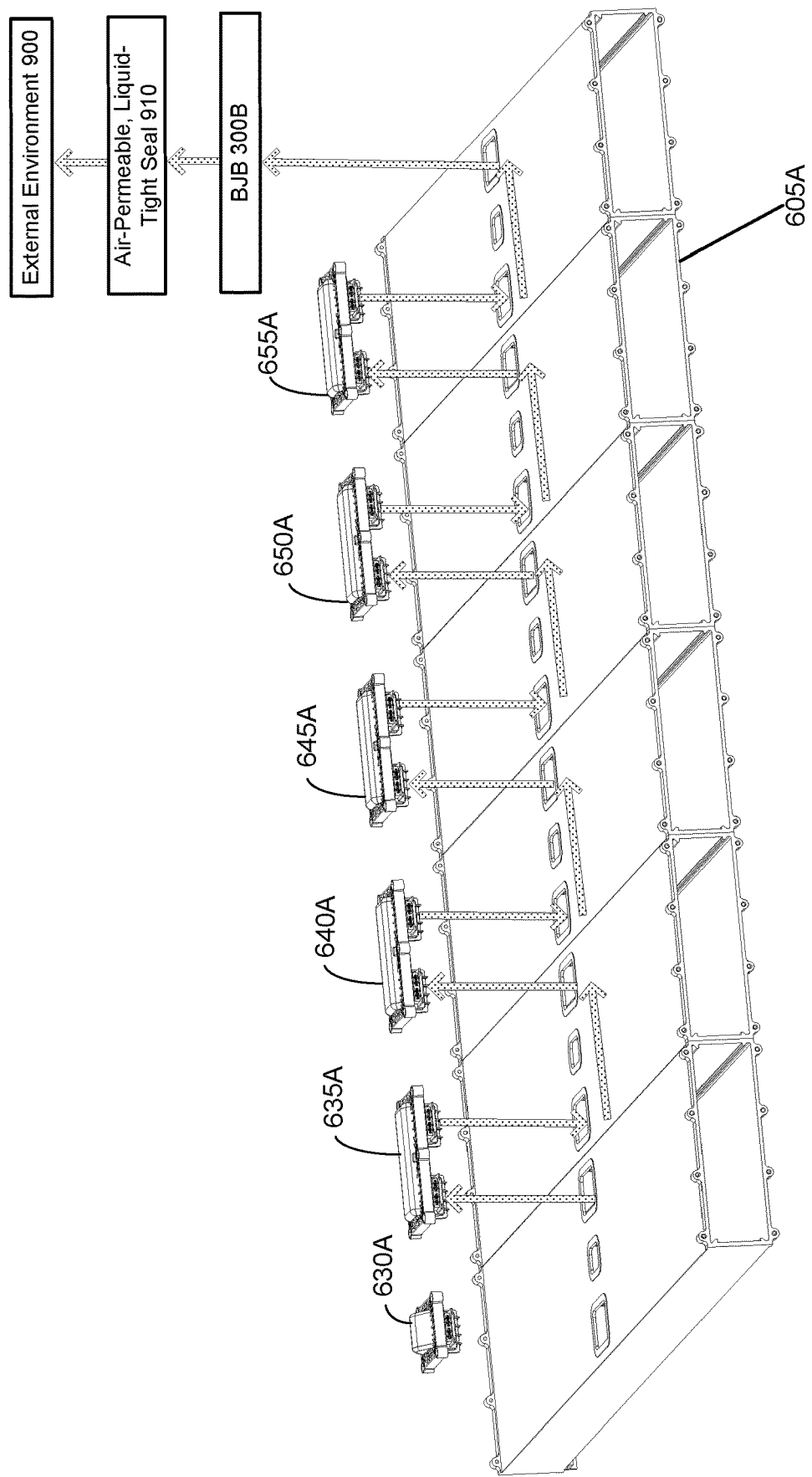
FIG. 9A illustrates a venting arrangement that defines a set of air channels through a tunnel space to permit pressure equalization between respective battery module compartments and an external environment in accordance with an embodiment of the disclosure.

FIG. 9A illustrates a venting arrangement that defines a set of air channels through the tunnel space 315A to permit pressure equalization between respective battery module compartments and an external environment 900 in accordance with an embodiment of the disclosure. While the arrows in FIG. 6A are used to show the manner in which module-to-module power connectors 630A-655A are inserted into respective holes of the battery module mounting area 605A, in FIG. 9A, the arrows are shown to emphasize the direction of air movement.

Referring to FIG. 9A, air inside the battery module mounting area 605A flows (in order) from battery module compartment to battery module compartment through the respective module-to-module power connectors 635A-655A, and then to the BJB 300B via a module-to-BJB power connector (not shown). Accordingly, in an example, if there is a pressure change (e.g., due to a change in altitude, temperature, etc., which may occur if the battery module compartments are arranged on an airplane, and so on), the airflow over air channel(s) through the module-to-module power connectors 635A-655A to the external environment 900 acts as a labyrinth that guarantees pressure equalization. The module-to-BJB power connector may be configured somewhat similarly to the module-to-module power connector 630A, except that the module-to-BJB power connector does not connect battery modules in series, and instead is connected to positive and negative terminals on the BJB 300B. The module-to-BJB power connector includes gaps similarly to the module-to-module power connectors 635A-655A to permit airflow.

Referring to FIG. 9A, in an embodiment, the pressurization equalization achieved by the airflow over the air channel(s) may occur as a passive function without any active component (e.g., no fans, etc.). Moreover, the pressurization equalization achieved by the airflow over the air channel(s) may generally be used to address gradual pressurization differentials that form between the battery module compartments and the external environment 900 (e.g., a user drives an electric vehicle up or down a mountain which causes changes to altitude and temperature, batteries heat up during driving and/or charging which causes an internal pressure increase due to air expansion, a thunderstorm develops in the external environment 900, etc.). However, it is also possible for pressure to increase inside the battery module compartments in a fast and potentially catastrophic manner (e.g., in response to a fire inside one or more of the battery module compartments). In such cases, the pressure valve 125 on one or more of the battery modules may open to reduce the pressure inside of the battery module compartments more quickly than can be achieved via the venting arrangement described above with respect to FIG. 9A.

Further, in an embodiment, the air channel(s) defined by the gaps inside the module-to-module power connectors through are configured in a labyrinthine manner to limit both the rate at which air moves through the module-to-module power connectors between different battery module compartments as well as the types of materials that can move the air channel(s). This 'labyrinth' structure may be sufficient to achieve the gradual pressure equalization objective noted above, while also being configured to reduce or block one or more contaminants (e.g., dirt, dust, smoke, etc.) from propagating between different battery module compartments.

Referring to FIG. 9A, the air channel(s) from the battery module compartments are fed to the BJB 300B via the module-to-BJB power connector, and the BJB 300B further feeds the air channel(s) via a pathway (e.g., a tube or pipe) to the external environment 900. At some point along the pathway from the BJB 300B (or inside the BJB 300B itself), the pathway is sealed via an air-permeable, liquid-tight seal 910 such as an air permeable membrane (e.g., a GORE-TEX membrane). The air-permeable, liquid-tight seal 910 permits air to flow between the external environment 900 and the battery module compartments (s), while protecting the battery module compartments from contaminants such as dust, debris and humidity. In a further example, the air-permeable, liquid-tight seal 910 may be arranged above a max waterline for the electric vehicle. For example, if the air-permeable, liquid-tight seal 910 is arranged inside of the BJB 300B, then at least part of the BJB 300B itself may be arranged above the max waterline for the electric vehicle. In a further example, the air-permeable, liquid-tight seal 910 may be below above the max waterline for the electric vehicle, while the pathway to the external environment 900 extends from the location of the air-permeable, liquid-tight seal 910 to a location that is above the max waterline. In a further embodiment, while not shown in FIG. 10, the BJB 300B may alternatively be arranged at a lower point of the electric vehicle (e.g., inside a battery module compartment, etc.). In this case, the air-permeable, liquid-tight seal 910 may be installed outside of the BJB 300B at a higher location (e.g., above the max waterline). In a further example, multiple air-permeable, liquid-tight seals 910 may be used in the venting arrangement of FIG. 9A for redundancy (e.g., each module-to-module power connector and/or the module-to-BJB power connector may be equipped with its own air-permeable membrane for redundancy in terms of humidity protection, etc.).

Figure 9B:
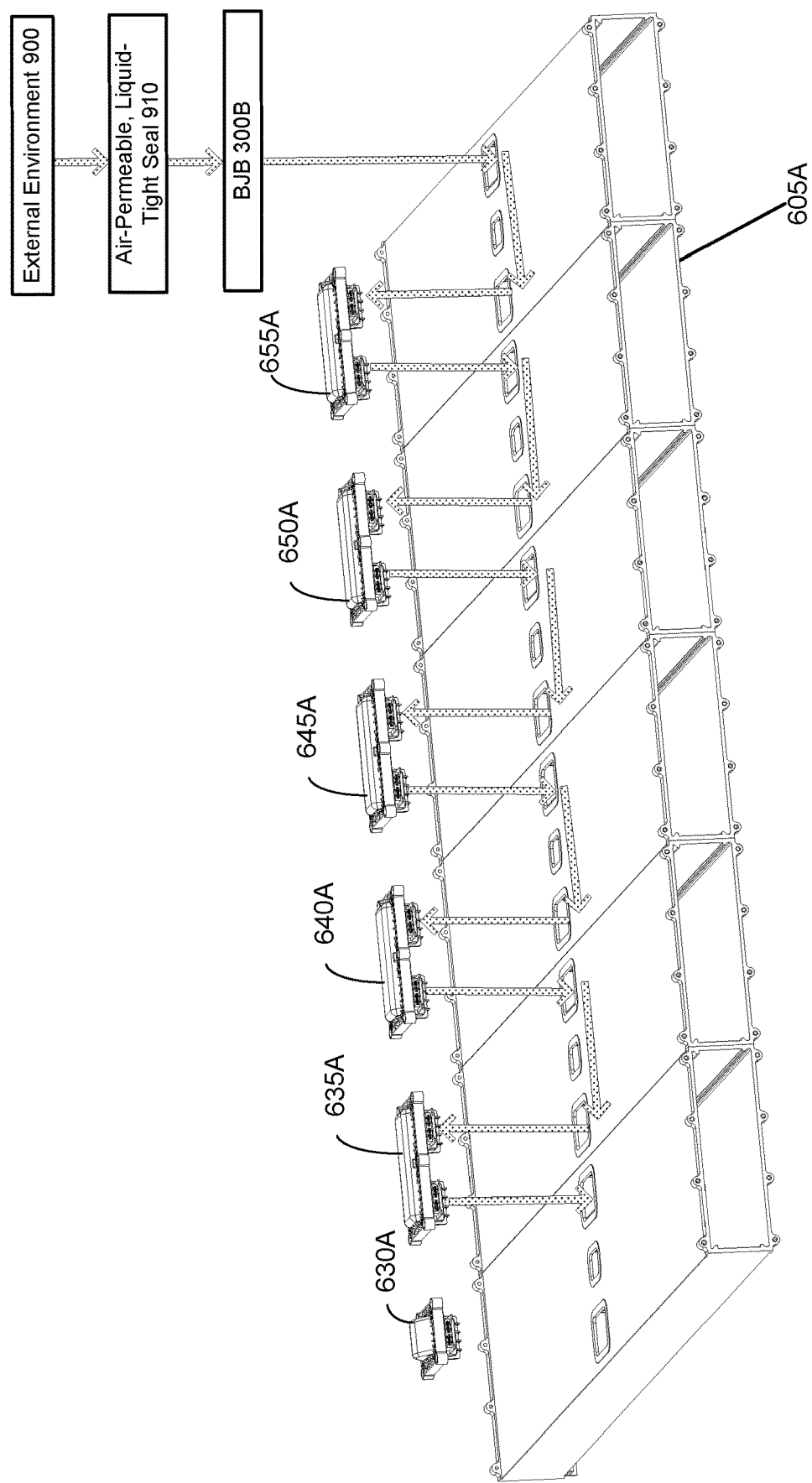
FIG. 9B illustrates a venting arrangement that defines a set of air channels through a tunnel space to permit pressure equalization between respective battery module compartments and an external environment in accordance with another embodiment of the disclosure.

FIG. 9B illustrates another venting arrangement that defines a set of air channels through the tunnel space 315A to permit pressure equalization between respective battery module compartments and an external environment 900 in accordance with another embodiment of the disclosure. Structurally, the venting arrangement in FIG. 9B is identical to the venting arrangement in FIG. 9A. However, the air inside of the air channel(s) in FIGS. 9A-9B move in opposite directions. In particular, FIG. 9A depicts an inside-to-outside airflow, which occurs when external environment pressure is lower than a pressure inside of the battery module compartments, whereas FIG. 8B depicts an outside-to-inside airflow, which occurs when external environment pressure is higher than the pressure inside of the battery module compartments.

Referring to FIGS. 9A-9B, the air channel(s) between the battery module compartments and the external environment 900 may help to achieve pressure equalization, which may protect the battery module compartments from overpressure conditions. For example, the pressure equalization reduces mechanical stress on joint connections in the battery housing, which helps to ensure that the battery module compartments remain sealed over time.

Figure 10:
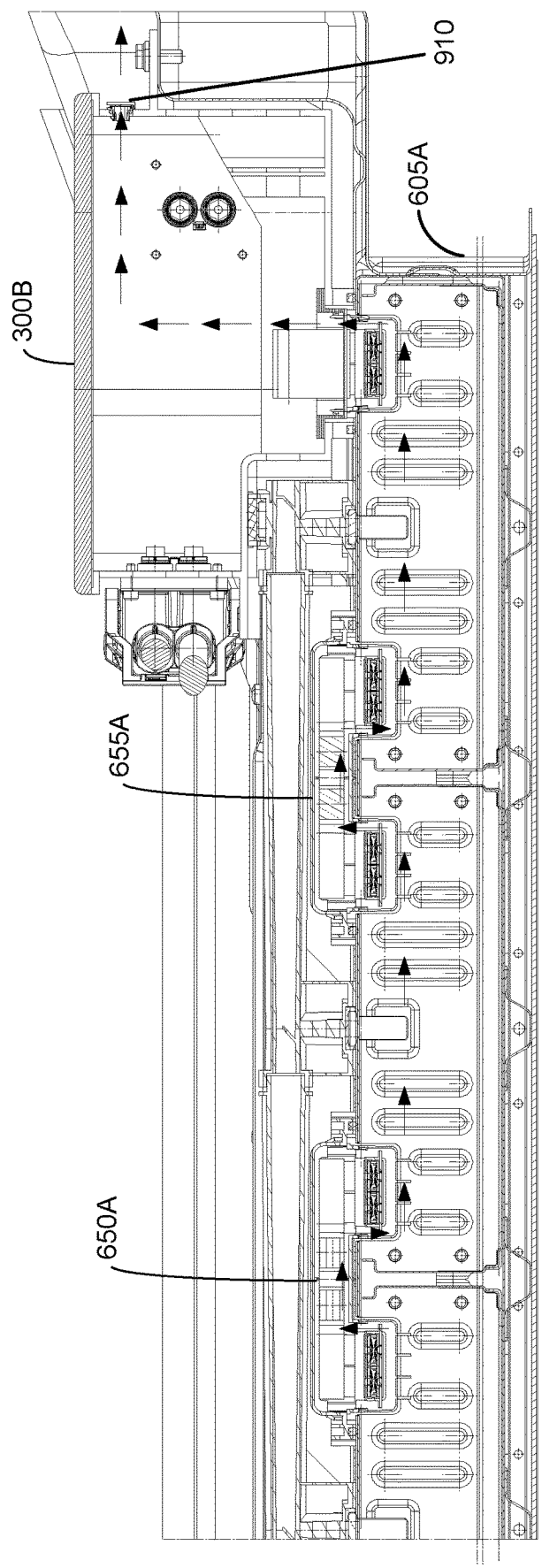
FIG. 10 illustrates a side-perspective of the venting arrangement of FIG. 9A in accordance with an embodiment of the disclosure.

FIG. 10 illustrates a side-perspective of the venting arrangement of FIG. 9A in accordance with an embodiment of the disclosure. Referring to FIG. 10, the air-permeable, liquid-tight seal 910 is shown as integrated into the BJB 300B. Similar to FIG. 9A, the arrows in FIG. 10 denote the direction of airflow in a scenario where the external environment pressure is lower than the pressure inside of the battery module compartments.

As will be appreciated, the direction of airflow in FIG. 10 is from inside the battery module compartments towards the external environment 900. This will generally occur when the external environment 900 has a lower pressure than a pressure inside the battery module compartments. However, it is also possible for the external environment 900 to have a higher pressure than a pressure inside the battery module compartments (e.g., as in FIGS. 8B and 9B), in which case the airflow direction is reversed from the direction indicated by the arrows in FIG. 10.

It will be appreciated that the air-permeable, liquid-tight seal 910 (e.g., an air-permeable membrane such as GORE-TEX) may not able to instantly compensate for pressure differentials that develop between the battery module compartments and the external environment 900. Rather, the rate at which the pressure is equalized may be defined by a damping function. For example, assume that the electric vehicle is being driven, and the battery modules inside the battery module compartments heat up to 35° C. Now, further assume that the electric vehicle drives through a patch of ice water. This will cause the battery module compartments to cool down quickly, and the volume of air trapped inside the battery module compartments will begin to decrease, causing the pressure inside the battery module compartments to drop to −55 mbar below an external environment pressure in an example. The resulting pressure differential to the external environment 900 will be compensated by the air-permeable, liquid-tight seal 910 (e.g., an air-permeable membrane such as GORE-TEX), which functions as a pressure compensation valve, over a period of a few minutes.

Moreover, while the air channel(s) in FIGS. 8A-10 are defined in part through the module-to-module power connectors inside the tunnel space 315A, any component(s) implemented inside the tunnel space 315A may be configured to define the air channel(s) in other embodiments. For example, a data communications interface such as the above-described LV busbars and/or optical communications interface (e.g., light tube, etc.) arranged inside the tunnel space 315A may be used in place of, or in addition to, the module-to-module power connectors to establish the air channel(s) or add air channel(s). In this case, the venting arrangement may be configured to include the data communications interface.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. An energy storage system, comprising:
a battery module mounting area including a plurality of battery module compartments, each of the plurality of battery module compartments configured to house a respective battery module and the plurality of battery module compartments configured with a set of overpressure valves that are each configured to open in response to an overpressure condition in a respective battery module compartment; and
a venting arrangement configured to define a set of air channels between the plurality of battery module compartments and an external environment that permits passive pressure equalization between the plurality of battery module compartments and the external environment while the set of overpressure valves remain closed,
wherein the venting arrangement is configured with an air-permeable, liquid-tight seal at least between (i) the plurality of battery module compartments and (ii) the external environment.

2. The energy storage system of claim 1, wherein the battery module mounting area includes a first set of battery module compartments arranged along a first lateral side of the battery module mounting area, and a second set of battery module compartments arranged along a second lateral side of the battery module mounting area.

3. The energy storage system of claim 2,
wherein the venting arrangement includes a tunnel space defined between the first and second sets of battery module compartments, the battery module mounting area including a set of holes that open into the tunnel space, wherein the set of air channels is defined through the tunnel space to permit airflow between the first and second sets of battery module compartments and the external environment.

4. The energy storage system of claim 3, wherein the set of air channels is defined through a labyrinthine pathway inside of the tunnel space to permit the airflow between the first and second sets of battery module compartments and the external environment while reducing or blocking propagation of one or more contaminants between different battery module compartments.

5. The energy storage system of claim 4, wherein the one or more contaminants include dirt, dust, smoke or a combination thereof.

6. The energy storage system of claim 1, wherein the air-permeable, liquid-tight seal is an air-permeable membrane.

7. The energy storage system of claim 1,
wherein the energy storage system is configured to provide power to an electric vehicle, further comprising:
a battery junction box (BJB) that is electrically connected to battery modules in the plurality of battery module compartments.

8. The energy storage system of claim 7,
wherein the BJB is arranged on top of the battery module mounting area, and
wherein the air-permeable, liquid-tight seal is included inside the BJB.

9. The energy storage system of claim 7, wherein the air-permeable, liquid-tight seal is arranged over a max waterline of the electric vehicle.

10. The energy storage system of claim 1, wherein a pressure inside of the plurality of battery module compartments being higher than an external environment pressure causes airflow along the set of air channels to move in an inside-to-outside direction.

11. The energy storage system of claim 1, wherein a pressure inside of the plurality of battery module compartments being lower than an external environment pressure causes airflow along the set of air channels to move in an outside-to-inside direction.

12. An energy storage system, comprising:
a battery module mounting area including a plurality of battery module compartments, each of the plurality of battery module compartments configured to house a respective battery module and the plurality of battery module compartments configured with a set of overpressure valves that are each configured to open in response to an overpressure condition in a respective battery module compartment; and
a venting arrangement configured to define a set of air channels that permits passive pressure equalization between the plurality of battery module compartments and an external environment while the set of overpressure valves remain closed,
wherein the venting arrangement is configured with an air-permeable, liquid-tight seal at least between (i) the plurality of battery module compartments and (ii) the external environment,
wherein the battery module mounting area includes a first set of battery module compartments arranged along a first lateral side of the battery module mounting area, and a second set of battery module compartments arranged along a second lateral side of the battery module mounting area,
wherein the venting arrangement includes a tunnel space defined between the first and second sets of battery module compartments, the battery module mounting area including a set of holes that open into the tunnel space,
wherein the set of air channels is defined through the tunnel space to permit airflow between the first and second sets of battery module compartments and the external environment,
wherein the venting arrangement further includes a plurality of module-to-module power connectors arranged in the tunnel space, each of the plurality of module-to-module power connectors including at least one busbar and electrical interfaces that are configured to form at least one electrical connection between at least one pair of battery modules inserted into at least one respective pair of adjacent battery module compartments, and
wherein the set of air channels is defined in part through the plurality of module-to-module power connectors.

13. The energy storage system of claim 12,
wherein the venting arrangement further includes a data communications interface arranged in the tunnel space, and
wherein the set of air channels is defined in part through the data communications interface.

14. The energy storage system of claim 13, wherein the data communications interface is a wired data communications interface or an optical communications interface.

* * * * *